United States Patent
Zhu et al.

(10) Patent No.: US 12,238,602 B2
(45) Date of Patent: Feb. 25, 2025

(54) AI/ML BASED MOBILITY RELATED PREDICTION FOR HANDOVER

(71) Applicant: QUALCOMM Incorporated, San Diego, CA (US)

(72) Inventors: Xipeng Zhu, San Diego, CA (US); Ozcan Ozturk, San Diego, CA (US); Punyaslok Purkayastha, San Diego, CA (US); Rajeev Kumar, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 17/808,072

(22) Filed: Jun. 21, 2022

(65) Prior Publication Data

US 2023/0413152 A1    Dec. 21, 2023

(51) Int. Cl.
  *H04W 36/32*     (2009.01)
  *H04L 5/00*      (2006.01)
  *H04W 36/30*     (2009.01)

(52) U.S. Cl.
  CPC ........ *H04W 36/32* (2013.01); *H04L 5/0053* (2013.01); *H04W 36/30* (2013.01)

(58) Field of Classification Search
  CPC ... H04W 36/32; H04W 36/30; H04W 64/006; H04W 36/0058; H04L 5/0053
  See application file for complete search history.

(56) References Cited

U.S. PATENT DOCUMENTS

| 2015/0146689 A1* | 5/2015 | Fu ................... H04J 3/0632 370/331 |
| 2024/0040461 A1* | 2/2024 | Da Silva ............. H04W 36/30 |
| 2024/0251258 A1* | 7/2024 | Monteiro ........ H04W 36/0058 |

FOREIGN PATENT DOCUMENTS

| WO | 2020254859 A1 | 12/2020 |
| WO | 2021107831 A1 | 6/2021 |

(Continued)

OTHER PUBLICATIONS

Ericsson: "AI/ML Load Balancing and Mobility Optimization Use Cases", 3GPP TSG-RAN WG3 Meeting #114-bis-e, R3-220310, 3rd Generation Partnership Project, Mobile Competence Centre, 650, Route Des Lucioles, F-06921 Sophia-Antipolis Cedex, France, vol. RAN WG3, No. Online meeting, Jan. 17, 2022-Jan. 26, 2022, Jan. 6, 2022, XP052090034, 19 pages.

(Continued)

*Primary Examiner* — Rushil P. Sampat
(74) *Attorney, Agent, or Firm* — Procopio, Cory, Hargreaves & Savitch LLP

(57) ABSTRACT

A source network node and a UE may obtain at least one mobility related prediction associated with the UE or at least one target network node, the at least one mobility related prediction being derived by at least one neural network, and the source network node may handover the UE from the source network node to the at least one target network node based on the at least one mobility related prediction. The target network node may receive the handover request, obtain at least one mobility related prediction associated with the UE or the target network node, and output for transmission a handover request ACK, the handover request ACK based at least in part on the at least one mobility related prediction.

30 Claims, 16 Drawing Sheets

(56) References Cited

FOREIGN PATENT DOCUMENTS

WO    WO 2022/005353 A1 * 1/2022
WO    WO 2022/255918 A1 * 1/2022

OTHER PUBLICATIONS

International Search Report and Written Opinion—PCT/US2023/022974—ISA/EPO—Sep. 12, 2023.
Samsung: "Discussion on Standard Impact for RAN Intelligence (Mobility Optimization)", 3GPP TSG-RAN WG3 Meeting #113-e, R3-213715, 3rd Generation Partnership Project, Mobile Competence Centre, 650, Route Des Lucioles, F-06921 Sophia-Antipolis Cedex, France, vol. RAN WG3, No. E-Meeting, Aug. 16, 2021-Aug. 26, 2021, Aug. 6, 2021, XP052035487, 8 pages.

* cited by examiner

AI/ML BASED MOBILITY RELATED PREDICTION FOR HANDOVER

TECHNICAL FIELD

The present disclosure relates generally to communication systems, and more particularly, to a method of wireless communication include an artificial intelligence (AI) or machine learning (ML) (AI/ML) based mobility related prediction for handover procedure.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) configured to obtain at least one mobility related prediction associated with the UE or at least one target network node, the at least one mobility related prediction being derived by at least one neural network, and switch from a source network node to a first target network node of the at least one target network node based on the at least one mobility related prediction.

In an aspect of the disclosure, a method, a computer-readable medium, and an apparatus are provided. The apparatus may include a source network node configured to obtain at least one mobility related prediction associated with a UE or at least one target network node, the at least one mobility related prediction being derived by at least one neural network, and handover the UE from the source network node to the at least one target network node based on the at least one mobility related prediction.

In an aspect of the disclosure, a method, a computer-readable medium, and an apparatus are provided. The apparatus may include a target network node configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
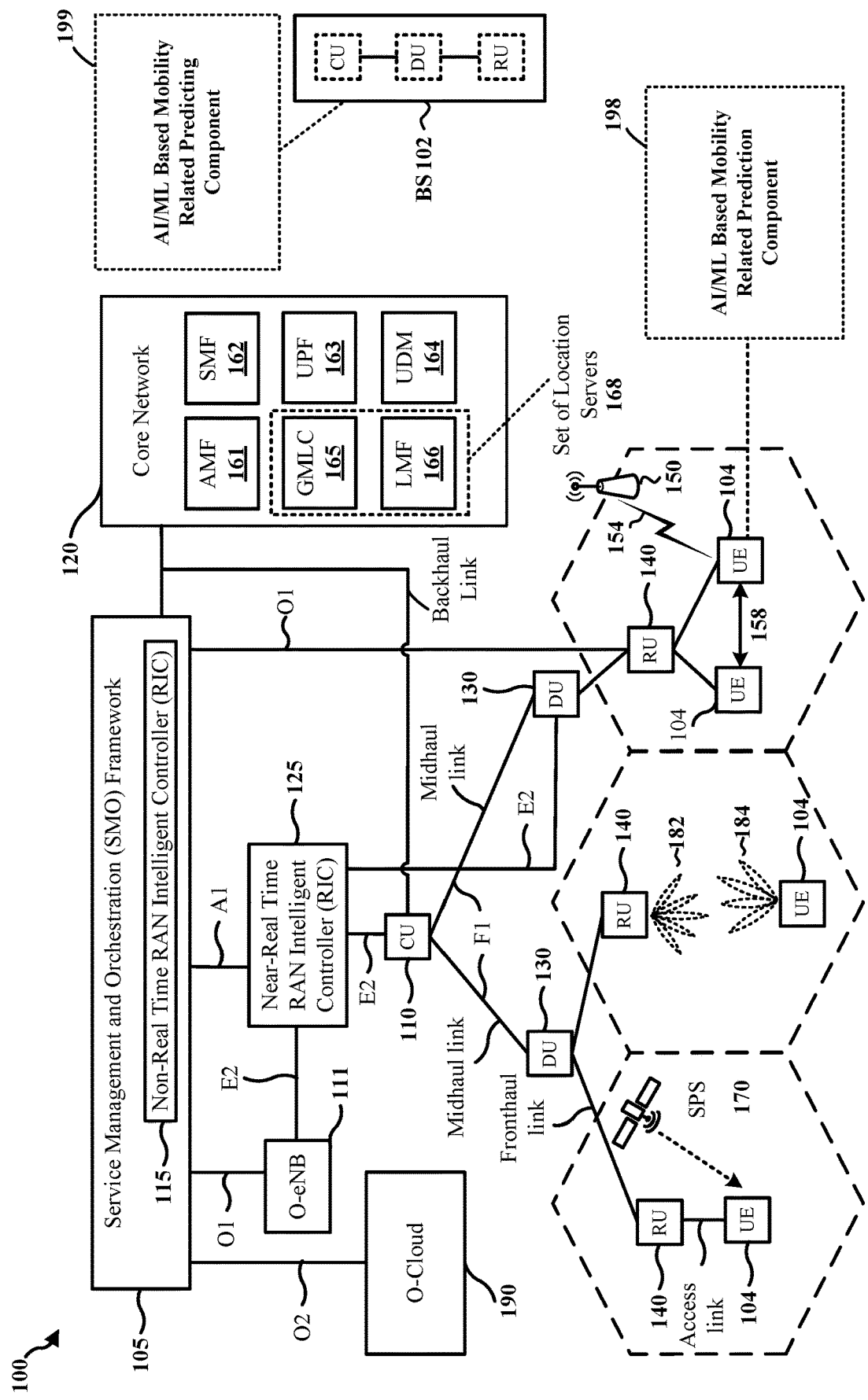
FIG. 1 is a diagram illustrating an example of a wireless communications system and an access network.

In a handover procedure, a source network node and a user equipment (UE) may consider multiple parameters to a) determine whether to perform a handover procedure or b) determine a target network node to handover the UE from the source network node. In some aspects of the current disclosure, the UE, the source network node, or the target network node may include a neural network or machine learning models to obtain/derive a prediction of the mobility, and the source network node or the UE may perform the handover procedure based on the prediction of the mobility to improve robustness and QoS/QoE during the handover procedure, and reduce UE power consumption and the network resource cost.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution. Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an AI/ML based mobility related prediction component 198 configured to obtain at least one mobility related prediction associated with the UE or at least one target network node, the at least one mobility related prediction being derived by at least one neural network, and switch from a source network node to a first target network node of the at least one target network node based on the at least one mobility related prediction. In certain aspects, the base station 102 may include an AI/ML based mobility predicting component 199 configured to obtain at least one mobility related prediction associated with a UE or at least one target network node, the at least one mobility related prediction being derived by at least one neural network, and handover the UE from the source network node to the at least one target network node based on the at least one mobility related prediction. In certain aspects, the base station 102 may include an AI/ML based mobility predicting component 199 configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction. Although the following description may be focused on 5G NR, the concepts described herein may be applicable to other similar areas, such as LTE, LTE-A, CDMA, GSM, and other wireless technologies.

Figures 2A, 2B, 2C, 2D:
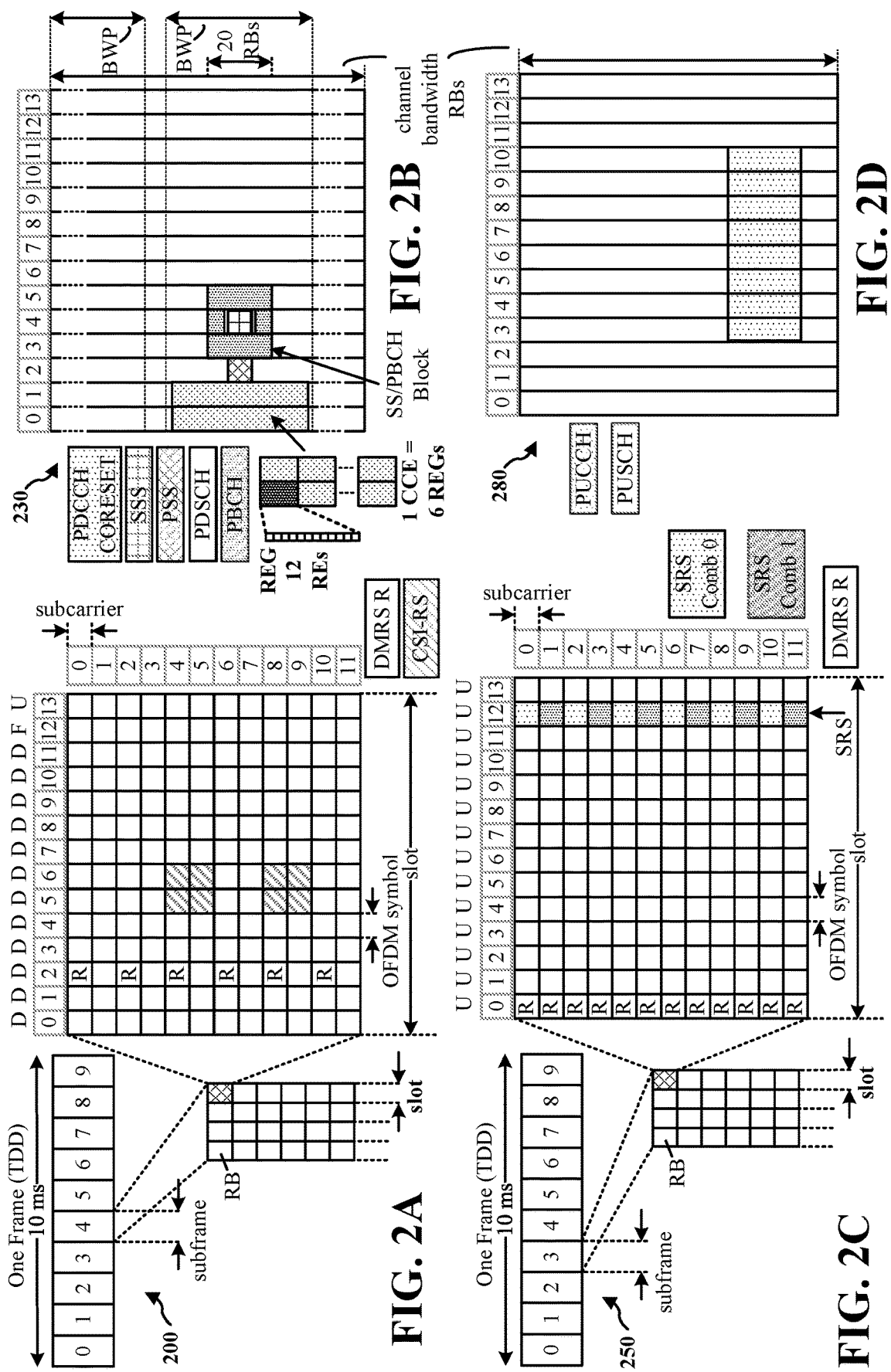
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 1 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
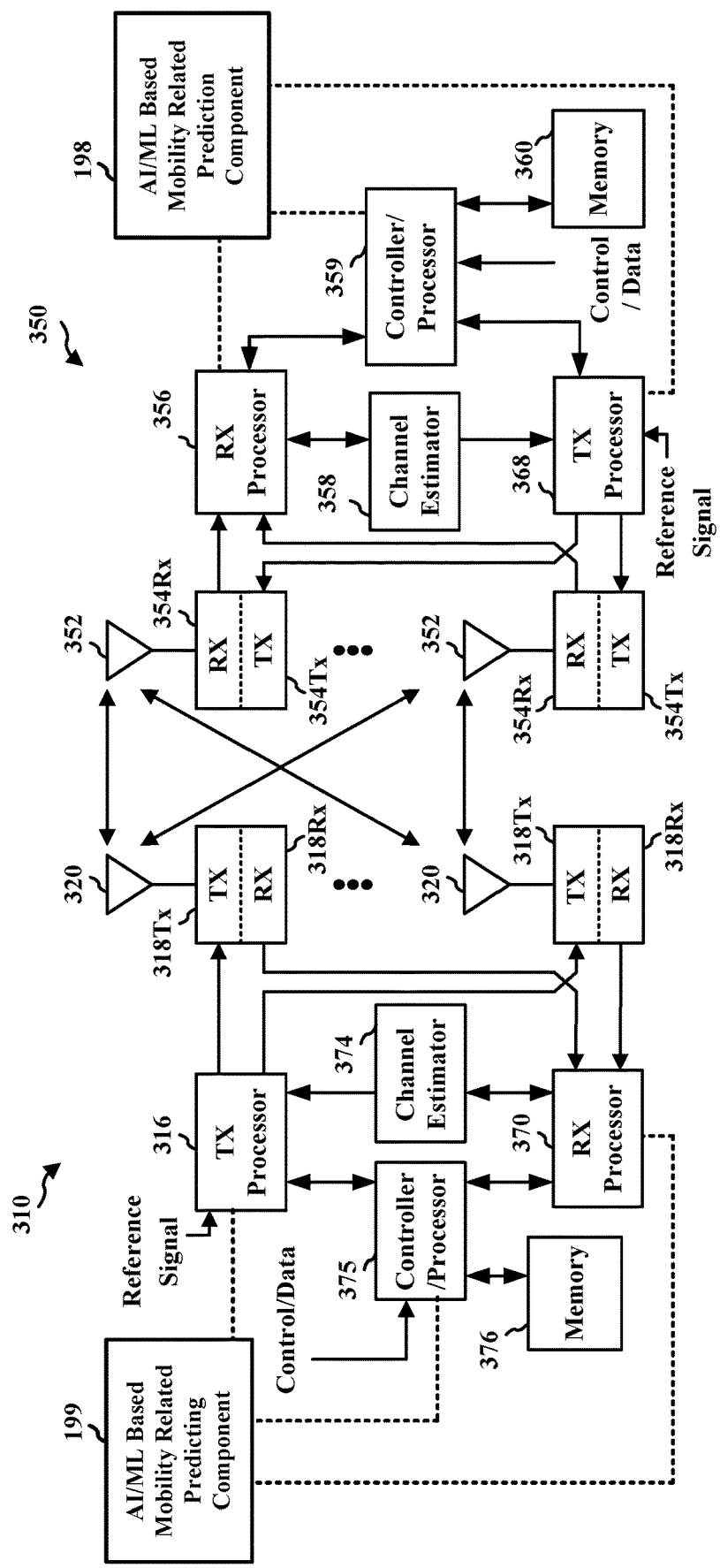
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the AI/ML based mobility related prediction component 198 of FIG. 1. At least one of the TX processor 316, the RX processor 370, and the controller/processor 375 may be configured to perform aspects in connection with the AI/ML based mobility predicting component 199 of FIG. 1.

A handover procedure may refer to a procedure of handing over (or transferring) a UE from being served by one cell to being served by another cell. In some aspects, a call of a UE may be in progress during the handover procedure from the serving cell to another cell, e.g., a target cell. The handover procedure may be triggered in response to the UE, e.g., mobile device, moving from one place to another or a change in wireless network connection. Here, the serving cell may be associated with a serving network node and the target cell may be associated with a target network node.

In some aspects, the network, including the base station, may decide to handover a UE from one cell to another based on measurement reports received from the UE. That is, based on the measurement reports received from the UE, the base station may decide to handover the UE from a first cell to a second cell. The measurement reports may include multiple measurements of cell metric, e.g., reference signal received power (RSRP), reference signal received quality (RSRQ), signal to interference & noise ratio (SINR), and the signal quality of the serving cell and neighbor cells may be measured using various ways, e.g., periodic measurement or event triggered measurement. That is, to reduce unnecessary handover procedures, the base station and the UE may be configured with a periodic measurement reports and/or an event triggered measurement reports, and the base station and the UE may perform the handover based on the measurement reports.

In some aspects, the event triggered handover procedure may be performed based on the event, which may refer to at least one type of measurement report. The base station may configure the UE with at least one type of events via RRC signaling message. That is, the UE may receive, from the base station, the RRC signaling message including a configuration of the at least one type of events.

In one aspect, the event may correspond to the measurement of the serving cell becoming better than the threshold value, e.g., Event A1, and the ongoing handover procedure may be canceled based on the Event A1. In another aspect, the event may correspond to the measurement of the serving cell becoming worse than the threshold value, e.g., Event A2, which may trigger a mobility procedure. In another aspect, the event may correspond to the measurement of the neighboring cell becoming an offset value better than the primary cell (PCell), e.g., Event A3, which may trigger an intra-frequency or inter-frequency handover procedures. In another aspect, the event may correspond to the measurement of the neighboring cell becoming better than the threshold value, e.g., Event A4, which may trigger the handover procedures that may not depend upon the coverage of the serving cell. In another aspect, the event may correspond to the measurement of the PCell becoming worse than a first threshold value and the neighboring cell becoming better than a second threshold value, e.g., Event A5, which may trigger the intra-frequency or inter-frequency handover procedures. In another aspect, the event may correspond to the measurement of the neighboring cell becoming an offset value better than the SCell, e.g., Event A6, which may be applicable to carrier aggregation. In another aspect, the event may correspond to the measurement of the inter-radio access technology (RAT) neighboring cell becoming better than the threshold value, e.g., Event B1, which may trigger the inter-RAT handover procedures which does not depend upon the coverage of the serving cell. In another aspect, the event may correspond to the measurement of the PCell becoming worse than a first threshold value and the inter-RAT neighboring cell becoming better than a second threshold value, e.g., Event B2, which may trigger the inter-RAT mobility procedures when the primary serving cell becomes weak.

Figure 4:
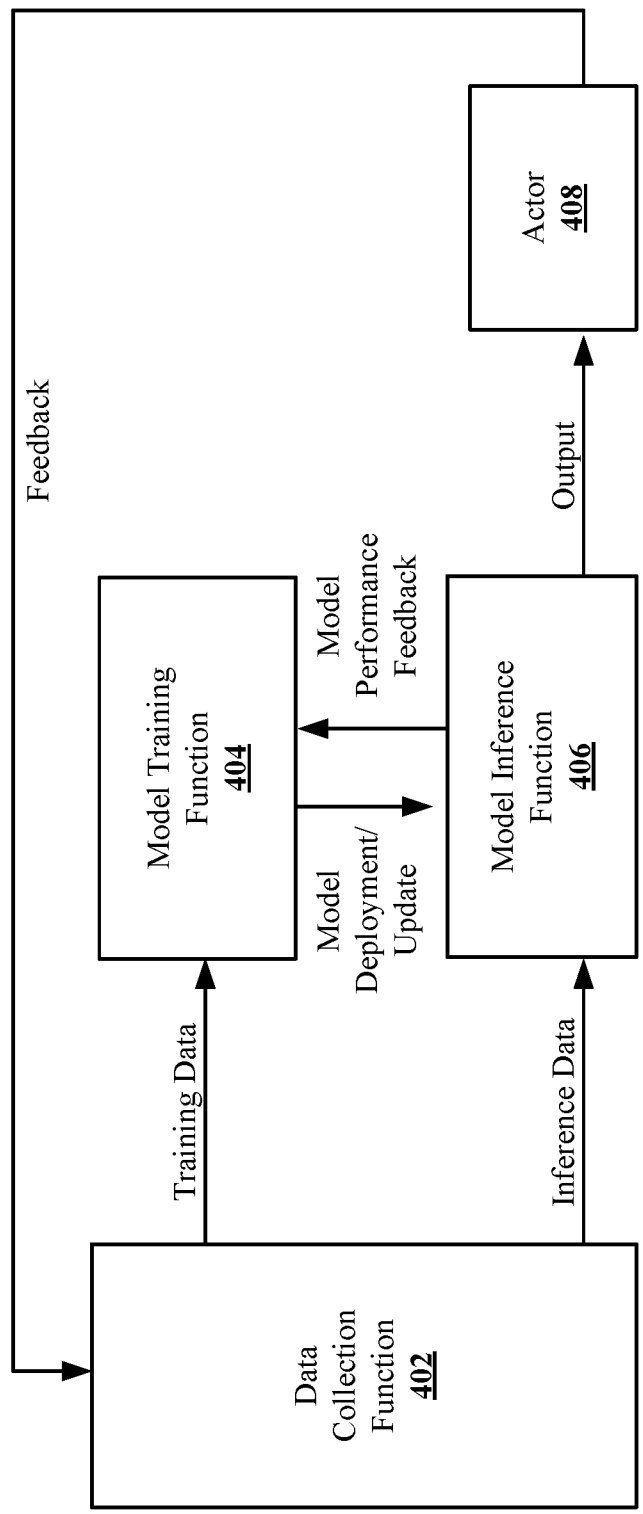
FIG. 4 is an example of the AI/ML algorithm of a method of wireless communication.

FIG. 4 is an example of the AI/ML algorithm 400 of a method of wireless communication. Here, the AI/ML algorithm 400 may be included in either the UE or the network node (e.g., the source network node or the target network node of the handover procedure) to provide the AI/ML based mobility related prediction. The AI/ML algorithm 400 may include various functions including a data collection function 402, a model training function 404, a model inference function 406, and an actor 408.

The data collection function 402 may be a function that provides input data to the model training function 404 and the model inference function 406. The data collection function 402 may include any form of data preparation, and it may not be specific to the implementation of the AI/ML algorithm (e.g., data pre-processing and cleaning, formatting, and transformation). The examples of input data may include, but not limited to, measurements from network entities including UEs or network nodes, feedback from the actor 408, output from another AI/ML model. The data collection function 402 may include training data, which refers to the data to be sent as the input for the model training function 404, and inference data, which refers to be sent as the input for the model inference function 406.

The model training function 404 may be a function that performs the ML model training, validation, and testing, which may generate model performance metrics as part of the model testing procedure. The model training function 404 may also be responsible for data preparation (e.g. data pre-processing and cleaning, formatting, and transformation) based on the training data delivered or received from the data collection function 402. The model training function 404 may deploy or update a trained, validated, and tested AI/ML model to the model inference function 406, and receive a model performance feedback from the model inference function 406.

The model inference function 406 may be a function that provides the model inference output (e.g. predictions or decisions). The model inference function 406 may also perform data preparation (e.g. data pre-processing and cleaning, formatting, and transformation) based on the inference data delivered from the data collection function 402. The output of the model inference function 406 may include the inference output of the AI/ML model produced by the model inference function 406. The details of the inference output may be use-case specific.

The model performance feedback may refer to information derived from the model inference function 406 that may be suitable for improvement of the AI/ML model trained in the model training function 404. The feedback from the actor 408 or other network entities (via the data collection function 402) may be implemented for the model inference function 406 to create the model performance feedback.

The actor 408 may be a function that receives the output from the model inference function 406 and triggers or performs corresponding actions. The actor 408 may trigger actions directed to network entities including the other network entities or itself. The actor 408 may also provide a feedback information that the model training function 404 or the model inference function 406 to derive training or inference data or performance feedback. The feedback may be transmitted back to the data collection function 402.

A UE and/or network entity (centralized and/or distributed units) may use machine-learning algorithms, deep-learning algorithms, neural networks, reinforcement learning, regression, boosting, or advanced signal processing methods for aspects of wireless communication, e.g., with a base station, a TRP, another UE, etc.

In some aspects described herein, an encoding device (e.g., a UE) may train one or more neural networks to learn dependence of measured qualities on individual parameters. Among others, examples of machine learning models or neural networks that may be comprised in the UE and/or network entity include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model. An output of one node is connected as the input to another node. Connections between nodes may be referred to as edges, and weights may be applied to the connections/edges to adjust the output from one node that is applied as input to another node. Nodes may apply thresholds in order to determine whether, or when, to provide output to a connected node. The output of each node may be calculated as a non-linear function of a sum of the inputs to the node. The neural network may include any number of nodes and any type of connections between nodes. The neural network may include one or more hidden nodes. Nodes may be aggregated into layers, and different layers of the neural network may perform different kinds of transformations on the input. A signal may travel from input at a first layer through the multiple layers of the neural network to output at a last layer of the neural network and may traverse layers multiple times.

In some aspects, the handover procedure may have an enhance mobility performance with the AI/ML based predictions. That is, the handover procedure may be based at least in part on a mobility related prediction of at least one of the UE or the network to improve the performance of the handover procedure. The AI/ML based predictions may include, but not limited to, a UE trajectory prediction, a UE traffic prediction, an RRM measurement prediction, a network resource status prediction, achievable QoS/QoE at the target network node, a location and/or mobility state.

In one aspect, the UE may include the AI/ML model to derive at least one mobility related prediction associated with the UE, and the at least one mobility related prediction associated with the UE may include at least one of a UE trajectory prediction, a UE traffic prediction, a radio resource management (RRM) measurement prediction, or a UE location and mobility status. In another aspect, the source network node may include the AI/ML model to derive at least one mobility related prediction associated with the UE, and the at least one mobility related prediction associated with the UE may include at least one of the UE trajectory prediction, the UE traffic prediction, the RRM measurement prediction, or the UE location and mobility status. In one example, the AI/ML model of the UE or the source network node may predict that the UE's trajectory is directed to enter a first target cell of a first target network node at a certain time, the UE and the source network node may determine to handover the UE to the first target network node at a time corresponding to the UE trajectory prediction. In another example, the AI/ML model may predict that the UE traffic is heavy, and the source network node may handover the UE to a target network node with the network throughput that may support the heavy UE traffic predicted by the AI/ML model.

In another aspect, the target network node may include the AI/ML model to derive at least one mobility related prediction associated with the target network node, and the at least one mobility related prediction associated with the target network node may include at least one of predictions of network resource capacity, including physical resource block (PRB) or transport network layer (TNL), or an achievable quality of service (QoS) or quality of experience (QoE) (QoS/QoE) at the at least one target network node after the handover. In one example, the AI/ML model of the target network node may predict the QoS after the handover of the UE from the source network node to the target network node, and the predicted QoS may be sent to the source network node for the source network node to determine whether to proceed with the handover of the UE from the source network node to the target network node.

Based on some aspects of the disclosure including the AI/ML based mobility related prediction, the handover procedure may have an improved robustness, improved QoS/QoE during the handover procedure, reduce UE power consumption, or reduce the network resource cost.

Figure 5:
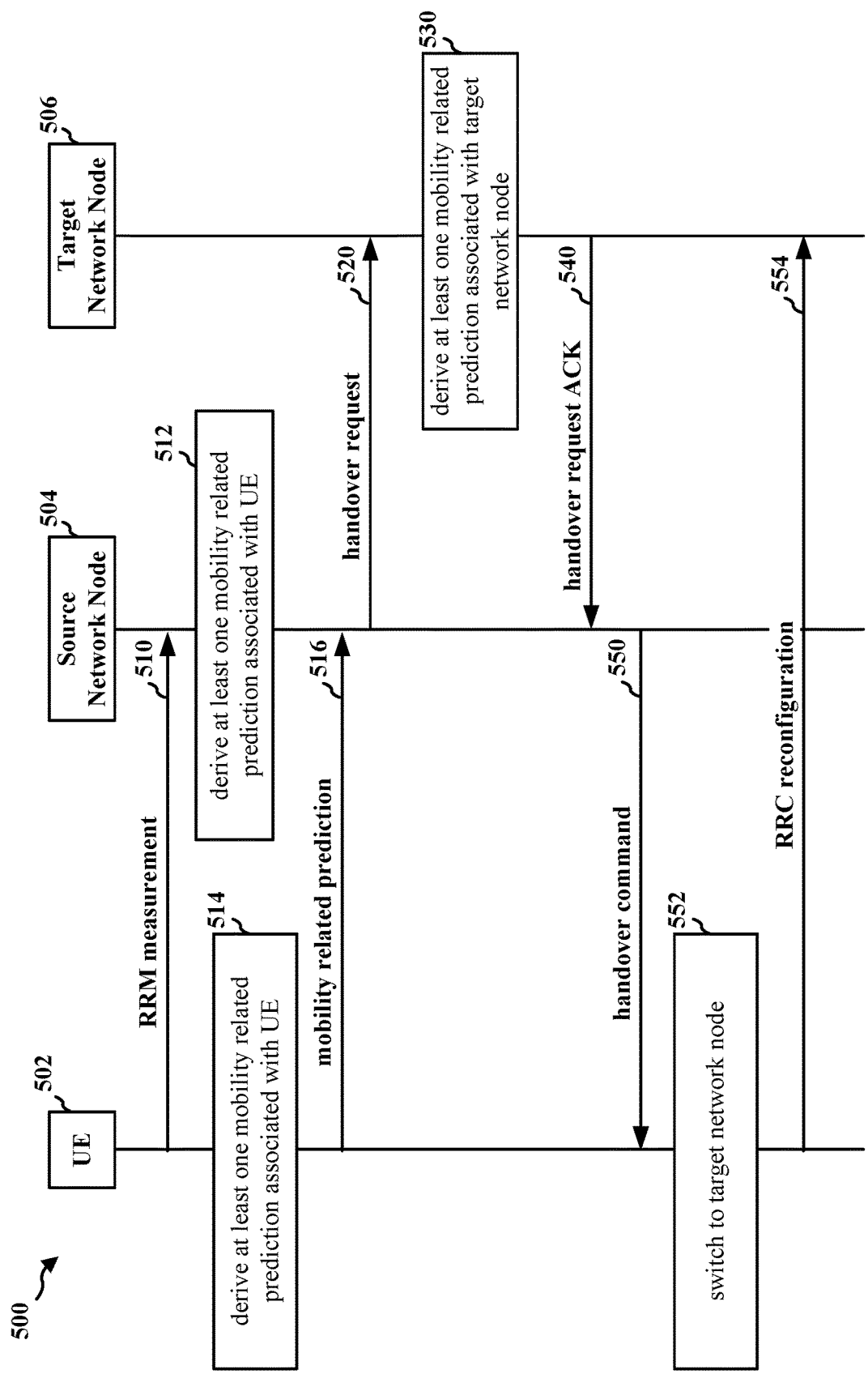
FIG. 5 is a call-flow diagram of a handover procedure.

FIG. 5 is a call-flow diagram 500 of a Xn or X2 (Xn/X2) based handover procedure. Here, the Xn/X2 may refer to the Xn interface in 5GNR or the X2 interface in LTE between the source network node and the target network node. That is, the source network node and the target network node may have the Xn/X2 interface configured between the source network node and the target network node, and the signaling of the handover may be communicated between the source network node and the target network node over the Xn/X2 interface.

The Xn/X2 based handover procedure may include a UE 502, a source network node 504, and a target network node 506. First, the UE 502 may perform RRM measurements of the source network node 504 and the target network node 506, and at 510, the UE 502 may transmit the measurement reports based on the RRM measurements to the source network node 504.

In some aspects, the source network node 504 may obtain at least one mobility related prediction associated with the UE 502 or the target network node 506. Here, the at least one mobility related prediction may be derived by at least one neural network. The at least one mobility related prediction may be associated with the UE 502, and the at least one mobility related prediction associated with the UE 502 may include at least one of the UE trajectory prediction, the UE 502 traffic prediction, the RRM measurement prediction, or the UE 502 location and mobility status.

In one aspect, at 512, the source network node 504 may derive the at least one mobility related prediction associated with the UE 502 using the at least one neural network of the source network node 504. That is, the source network node 504 may have the at least one neural network, and based on the measurement report received from the UE 502 at 510, the source network node 504 may derive the at least one mobility related prediction associated with the UE 502.

In another aspect, the source network node 504 may obtain the at least one mobility related prediction associated with the UE 502 by receiving, from the UE 502, the at least one mobility related prediction associated with the UE 502. At 514, the UE 502 may derive the at least one mobility related prediction associated with the UE 502 using the at least one neural network of the UE 502. That is, the UE 502 may have the at least one neural network and the UE 502 may use the at least one neural network to derive the at least one mobility related prediction associated with the UE 502. At 516, the UE 502 may transmit the at least one mobility related prediction associated with the UE 502 derived at 514, and the source network node 504 may obtain the at least one mobility related prediction associated with the UE 502.

In another aspect, the source network node 504 may obtain the at least one mobility related prediction associated with the target network node 506. The at least one mobility related prediction may be associated with the target network node 506, and the at least one mobility related prediction associated with the target network node 506 may include at least one of predictions of network resource capacity, including PRB/TNL, or an achievable QoS/QoE at the target network node 506 after the handover. First, based on the RRM measurement report received at 510 and/or the at least one mobility related prediction associated with the UE 502 (e.g., derived at 512 or received at 516), the source network node 504 may determine to handover the UE 502 to the target network node 506. based on determining to handover the UE 502 to the target network node 506, at 520, the source network node 504 may transmit a handover request to the target network node 506 via the Xn/X2 interface between the source network node 504 and the target network node 506. Here, the handover request at 520 may indicate the handover information associated with the UE 502 and the source network node 504, and furthermore, may include the at least one mobility related prediction associated with the UE 502 (e.g., derived at 512 or received at 516).

At 530, the target network node 506 may derive the at least one mobility related prediction associated with the target network node 506. That is, the target network node 506 may have the at least one neural network, and based on the handover request received from the source network node 504 at 520, the target network node 506 may derive the at least one mobility related prediction associated with the target network node 506.

At 540, the target network node 506 may transmit the handover request ACK in response to the handover request at 520. The handover request ACK may indicate the source network node 504 that the handover request is successfully transmitted to the target network node 506, and the target network node 506 may accept the handover of the UE 502 from the source network node 504. In one aspect, the target network node 506 may transmit the at least one mobility related prediction associated with the target network node 506 derived at 530 in the handover request ACK transmitted to the source network node 504 at 540. That is, the target network node 506 may transmit the at least one mobility related prediction associated with the target network node 506 derived at 530 to the source network node 504 in the handover request ACK at 540.

The source network node 504 may take the at least one mobility related prediction associated with the target network node 506 obtained at 540 into consideration to perform the handover of the UE 502 from the source network node 504 to the target network node 506. That is, based on the at least one mobility related prediction associated with the target network node 506, e.g., at least one of predictions of network resource capacity, including PRB/TNL, or an achievable QoS/QoE at the target network node 506 after the handover, to determine whether the target network node 506 is not suitable to handover the UE 502 from the source network node 504. For example, if the achievable QoS at the target network node 506 may not support the active call of the UE 502, the source network node 504 may determine not to handover the UE 502 to the target network node 506.

The source network node 504 may receive the handover request ACK from the target network node 506 at 540, and transmit a handover command to the UE 502 at 550. The handover command at 550 may instruct the UE 502 to switch to the target network node 506 to perform the handover of the UE 502 from the source network node 504 to the target network node 506.

At 552, the UE 502 may determine to switch to the target network node 506 based on the handover command received from the source network node 504. Here, determining to switch to the target network node 506 may refer to selecting a target resource configuration associated with the target network node 506. The target resource configuration associated with the target network node 506 may include a first cell or a target beam associated with the target network node 506.

At 554, the UE 502 may transmit an RRC reconfiguration message to the target network node 506 to establish a new RRC connection with the target network node 506 to perform the handover of the UE 502 from the source network node 504 to the target network node 506. The RRC message may include the indication of the target resource configuration associated with the first target network node 506.

In one aspect, the handover command received at 550 may include the at least one mobility related prediction associated with the UE 502 derived at 512. That is, if the UE 502 did not derive the at least one mobility related prediction associated with the UE 502 at 514, the source network node 504 may send the at least one mobility related prediction associated with the UE 502, e.g., at least one of the UE trajectory prediction, the UE 502 traffic prediction, the RRM measurement prediction, or the UE 502 location and mobility status, in the handover command 550, and the UE 502 may obtain the at least one mobility related prediction associated with the UE 502. The UE 502 may determine to switch to the target network node 506 based at least in part on the at least one mobility related prediction associated with the UE 502 received in the handover command at 550.

In another aspect, the handover command received at 550 may not include the at least one mobility related prediction associated with the UE 502, and the UE 502 may use the at least one mobility related prediction associated with the UE 502 derived at 514 to determine whether to switch to the target network node 506 based at least in part on the at least one mobility related prediction associated with the UE 502 derived at 514.

In another aspect, the handover command received at 550 may also include the mobility related prediction associated with the target network node 506 as derived at 530. That is, the source network node 504 may send the at least one mobility related prediction associated with the target network node 506, e.g., at least one of predictions of network resource capacity, including PRB/TNL, or an achievable QoS/QoE at the target network node 506 after the handover, and the UE 502 may determine whether to switch to the target network node 506 based at least in part on the at least one mobility related prediction associated with the target network node 506 received in the handover command at 550.

Figure 6:
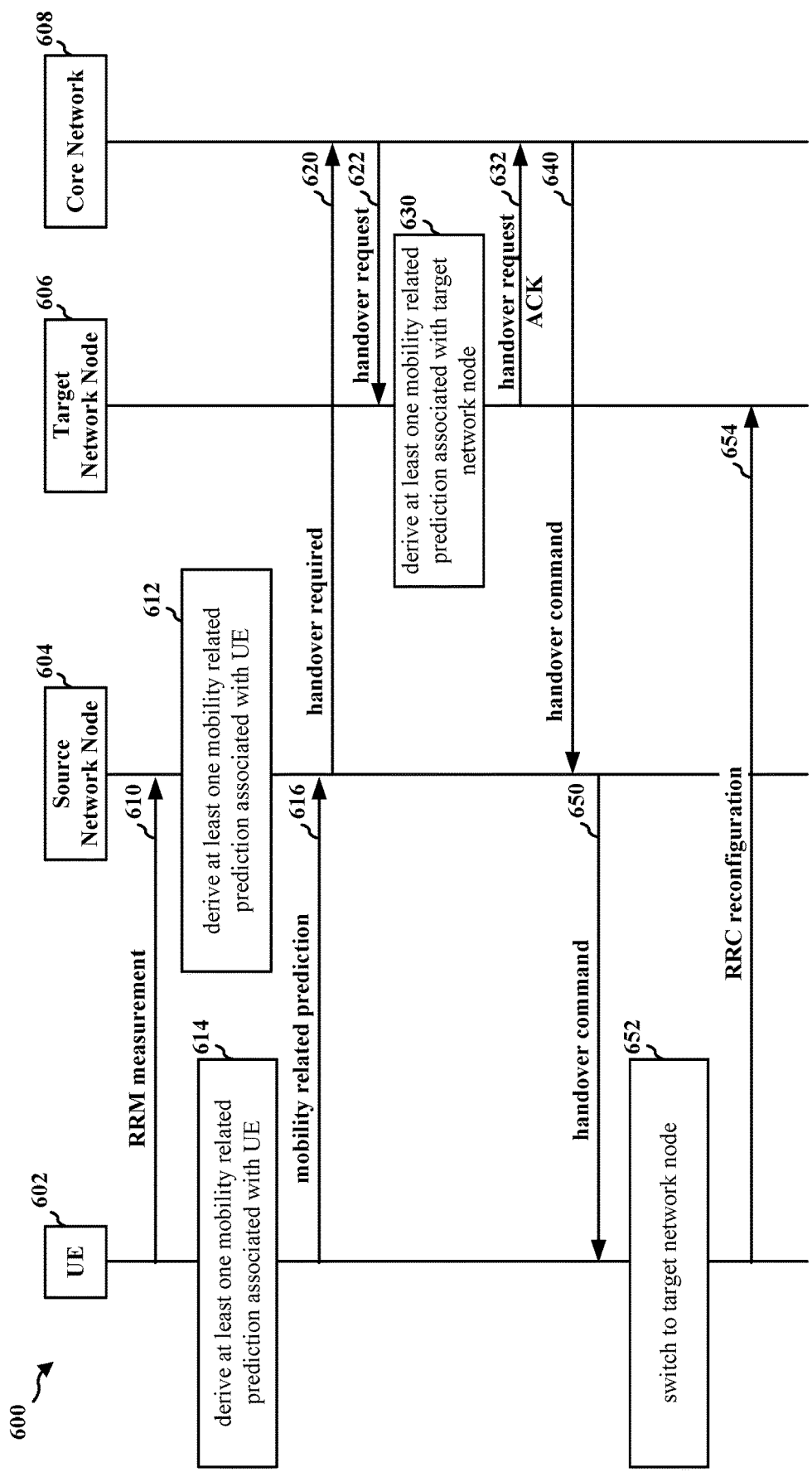
FIG. 6 is a call-flow diagram of a handover procedure.

FIG. 6 is a call-flow diagram 600 of an NGAP or S1 (NG/S1) based handover procedure. Here, the NG/S1 may refer to the NGAP protocol in 5GNR or the S1 interface in LTE between the network nodes and the core network. That is, the source network node and the target network node may not have the Xn/X2 interface configured between the source network node and the target network node, and the signaling of the handover may be communicated between the source network node and the target network node through the core network over the NG/S1 interface.

The NG/S1 based handover procedure may include a UE 602, a source network node 604, a target network node 606, and a core network 608. First, the UE may perform RRM measurements of the source network node and the target network node, and at 610, the UE may transmit the measurement reports based on the RRM measurements to the source network node.

In some aspects, the source network node 604 may obtain at least one mobility related prediction associated with the UE 602 or the target network node 606. Here, the at least one mobility related prediction may be derived by at least one neural network. The at least one mobility related prediction may be associated with the UE 602, and the at least one mobility related prediction associated with the UE 602 may include at least one of the UE trajectory prediction, the UE 602 traffic prediction, the RRM measurement prediction, or the UE 602 location and mobility status.

In one aspect, at 612, the source network node 604 may derive the at least one mobility related prediction associated with the UE 602 using the at least one neural network of the source network node 604. That is, the source network node 604 may have the at least one neural network, and based on the measurement report received from the UE 602 at 610, the source network node 604 may derive the at least one mobility related prediction associated with the UE 602.

In another aspect, the source network node 604 may obtain the at least one mobility related prediction associated with the UE 602 by receiving, from the UE 602, the at least one mobility related prediction associated with the UE 602.

At 614, the UE 602 may derive the at least one mobility related prediction associated with the UE 602 using the at least one neural network of the UE 602. That is, the UE 602 may have the at least one neural network and the UE 602 may use the at least one neural network to derive the at least one mobility related prediction associated with the UE 602. At 616, the UE 602 may transmit the at least one mobility related prediction associated with the UE 602 derived at 614, and the source network node 604 may obtain the at least one mobility related prediction associated with the UE 602.

In another aspect, the source network node 604 may obtain the at least one mobility related prediction associated with the target network node 606. The at least one mobility related prediction may be associated with the target network node 606, and the at least one mobility related prediction associated with the target network node 606 may include at least one of predictions of network resource capacity, including PRB/TNL, or an achievable QoS/QoE at the target network node 606 after the handover. First, based on the RRM measurement report received at 610 and/or the at least one mobility related prediction associated with the UE 602 (e.g., derived at 612 or received at 616), the source network node 604 may determine to handover the UE 602 to the target network node 606. based on determining to handover the UE 602 to the target network node 606, at 620, the source network node 604 may transmit a handover required message to the core network 608 via the NG/S1 interface between the source network node 604 and the core network 608. Here, the handover required message at 620 may indicate the handover information associated with the UE 602 and the source network node 604, and furthermore, may include the at least one mobility related prediction associated with the UE 602 (e.g., derived at 612 or received at 616). At 622, the core network 608 may transmit a handover request to the target network node 606 based on the handover required message received from the source network node 604 at 620.

The at least one mobility related prediction associated with the UE 602 may be included in a source to target transparent container for the NG/S1 based handover. Here, the source to target transparent container information element (IE) may refer to an IE that is used to transparently pass radio related information from the handover source (e.g., the source network node 604) to the handover target (e.g., the target network node 606). The at least one mobility related prediction associated with the UE 602 in the source to target transparent container may be transmitted to the core network 608 in the handover required message at 620, and the core network may convey the source to target transparent container including the at least one mobility related prediction associated with the UE 602 to the target network node 606. The target network node 606 may receive the at least one mobility related prediction associated with the UE 602 from the core network 608 in the handover request at 622, where the handover request includes the source to target transparent container including the at least one mobility related prediction associated with the UE 602 from the source network node 604.

At 630, the target network node 606 may derive the at least one mobility related prediction associated with the target network node 606. That is, the target network node 606 may have the at least one neural network, and based on the handover request received from the core network 608 at 622, the target network node 606 may derive the at least one mobility related prediction associated with the target network node 606.

At 632, the target network node 606 may transmit a handover request ACK to the target network node 606 based on the handover request received from the core network 608 at 622. The handover request ACK may indicate the core network 608 that the handover request is successfully transmitted to the target network node 606, and the target network node 606 may accept the handover of the UE 602 from the source network node 604. In one aspect, the target network node 606 may transmit the at least one mobility related prediction associated with the target network node 606 derived at 630 in the handover request ACK transmitted to the core network 608 at 632. That is, the target network node 606 may transmit the at least one mobility related prediction associated with the target network node 606 derived at 630 to the core network 608 in the handover request ACK at 632. At 640, the core network 608 may transmit a handover command in response to the handover request ACK received at 632.

The at least one mobility related prediction associated with the target network node 606 may be included in a target to source transparent container. Here, the target to source transparent container IE may refer to an IE that is used to transparently pass radio related information from the handover target (e.g., the target network node 606) to the handover source (e.g., the source network node 604). The at least one mobility related prediction associated with the target network node 606 in the target to source transparent container may be transmitted to the core network 608 in the handover required message at 620, and the core network may convey the target to source transparent container including the at least one mobility related prediction associated with the target network node 606 to the source network node 604. The source network node 604 may receive the at least one mobility related prediction associated with the target network node 606 from the core network 608 in the handover command at 640, where the handover command includes the target to source transparent container including the at least one mobility related prediction associated with the target network node 606 from the target network node 606.

The source network node 604 may take the at least one mobility related prediction associated with the target network node 606 obtained at 640 into consideration to perform the handover of the UE 602 from the source network node 604 to the target network node 606. That is, based on the at least one mobility related prediction associated with the target network node 606, e.g., at least one of predictions of network resource capacity, including PRB/TNL, or an achievable QoS/QoE at the target network node 606 after the handover, to determine whether the target network node 606 is not suitable to handover the UE 602 from the source network node 604. For example, if the achievable QoS at the target network node 606 may not support the active call of the UE 602, the source network node 604 may determine not to handover the UE 602 to the target network node 606.

The source network node 604 may receive the handover request ACK from the target network node 606 via the core network 608 at 640, and transmit a handover command to the UE 602 at 650. The handover command at 650 may instruct the UE 602 to switch to the target network node 606 to perform the handover of the UE 602 from the source network node 604 to the target network node 606.

At 652, the UE 602 may determine to switch to the target network node 606 based on the handover command received from the source network node 604. Here, determining to switch to the target network node 606 may refer to selecting a target resource configuration associated with the target network node 606. The target resource configuration associated with the target network node 606 may include a first cell or a target beam associated with the target network node 606.

At 654, the UE 602 may transmit an RRC reconfiguration message to the target network node 606 to establish a new RRC connection with the target network node 606 to perform the handover of the UE 602 from the source network node 604 to the target network node 606. The RRC message may include the indication of the target resource configuration associated with the first target network node 606.

In one aspect, the handover command received at 650 may include the at least one mobility related prediction associated with the UE 602 derived at 612. That is, if the UE 602 did not derive the at least one mobility related prediction associated with the UE 602 at 614, the source network node 604 may send the at least one mobility related prediction associated with the UE 602, e.g., at least one of the UE trajectory prediction, the UE 602 traffic prediction, the RRM measurement prediction, or the UE 602 location and mobility status, in the handover command 650, and the UE 602 may obtain the at least one mobility related prediction associated with the UE 602. The UE 602 may determine to switch to the target network node 606 based at least in part on the at least one mobility related prediction associated with the UE 602 received in the handover command at 650.

In another aspect, the handover command received at 650 may not include the at least one mobility related prediction associated with the UE 602, and the UE 602 may use the at least one mobility related prediction associated with the UE 602 derived at 614 to determine whether to switch to the target network node 606 based at least in part on the at least one mobility related prediction associated with the UE 602 derived at 614.

In another aspect, the handover command received at 650 may also include the mobility related prediction associated with the target network node 606 as derived at 630. That is, the source network node 604 may send the at least one mobility related prediction associated with the target network node 606, e.g., at least one of predictions of network resource capacity, including PRB/TNL, or an achievable QoS/QoE at the target network node 606 after the handover, and the UE 602 may determine whether to switch to the target network node 606 based at least in part on the at least one mobility related prediction associated with the target network node 606 received in the handover command at 650.

Figure 7:
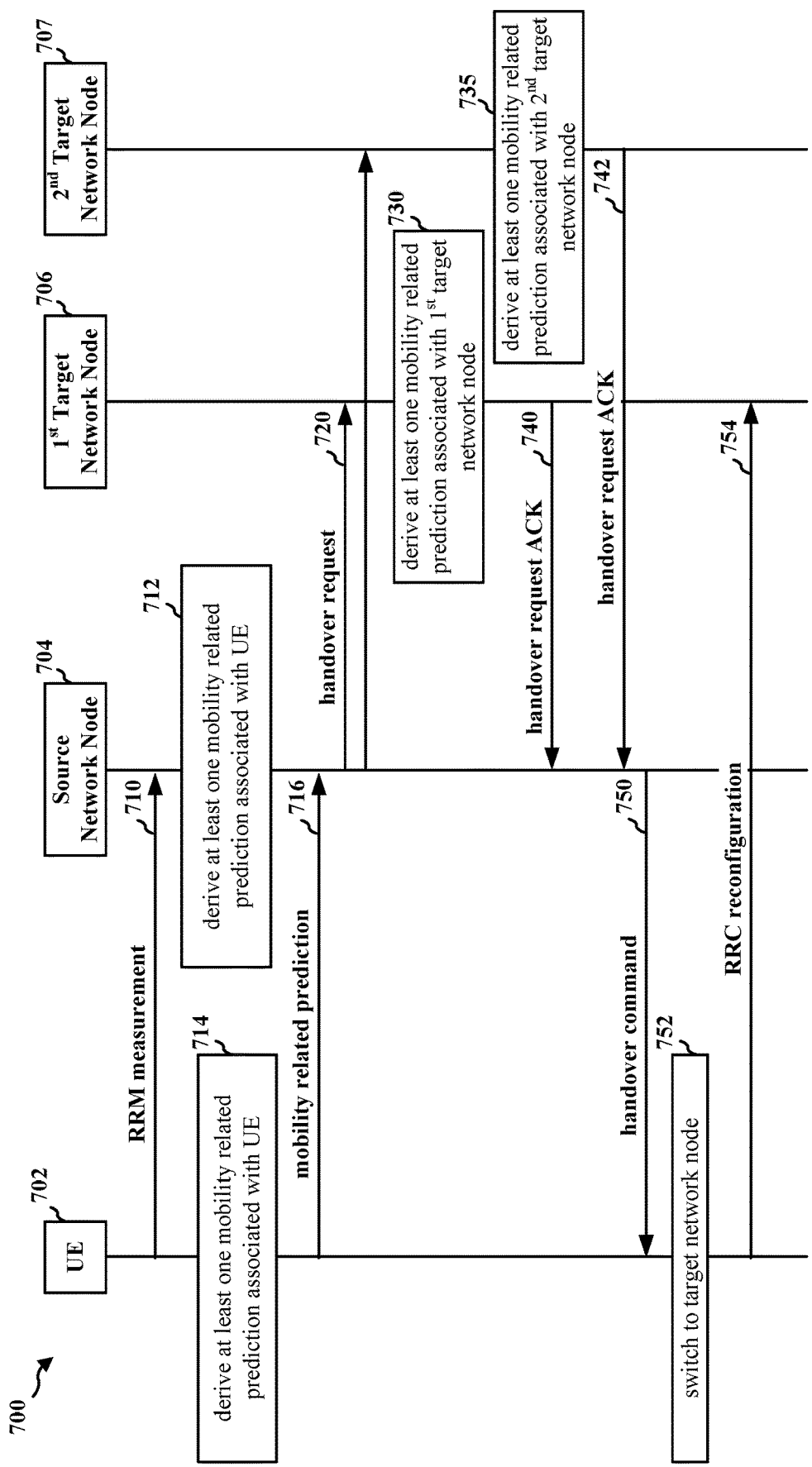
FIG. 7 is a call-flow diagram of a handover procedure.

FIG. 7 is a call-flow diagram 700 of a handover procedure. Here, the handover procedure may be a conditional hand over (CHO) with multiple target network nodes triggered for handover procedure. The handover procedure may include a UE 702, a source network node 704, a first target network node 706 and a second target network node 707. Here, the first target network node 706 and the second target network node 707 may be the multiple target network nodes triggered for handover procedure. That is, the UE 702 may transmit the measurement reports based on the RRM measurements to the source network node 704, and the measurement reports may trigger the handover of the UE 702 to one of the first target network node 706 and the second target network node 707.

In some aspects, the source network node 704 may obtain at least one mobility related prediction associated with the UE 702 or the target network node 706. Here, the at least one mobility related prediction may be derived by at least one neural network. The at least one mobility related prediction may be associated with the UE 702, and the at least one mobility related prediction associated with the UE 702 may include at least one of the UE trajectory prediction, the UE 702 traffic prediction, the RRM measurement prediction, or the UE 702 location and mobility status.

In one aspect, at 712, the source network node 704 may derive the at least one mobility related prediction associated with the UE 702 using the at least one neural network of the source network node 704. That is, the source network node 704 may have the at least one neural network, and based on the measurement report received from the UE 702 at 710, the source network node 704 may derive the at least one mobility related prediction associated with the UE 702.

In another aspect, the source network node 704 may obtain the at least one mobility related prediction associated with the UE 702 by receiving, from the UE 702, the at least one mobility related prediction associated with the UE 702. At 714, the UE 702 may derive the at least one mobility related prediction associated with the UE 702 using the at least one neural network of the UE 702. That is, the UE 702 may have the at least one neural network and the UE 702 may use the at least one neural network to derive the at least one mobility related prediction associated with the UE 702. At 716, the UE 702 may transmit the at least one mobility related prediction associated with the UE 702 derived at 714, and the source network node 704 may obtain the at least one mobility related prediction associated with the UE 702.

In another aspect, the source network node 704 may obtain the at least one mobility related prediction associated with the target network node 706. The at least one mobility related prediction may be associated with the target network node 706, and the at least one mobility related prediction associated with the target network node 706 may include at least one of predictions of network resource capacity, including PRB/TNL, or an achievable QoS/QoE at the target network node 706 after the handover. First, based on the RRM measurement report received at 710 and/or the at least one mobility related prediction associated with the UE 702 (e.g., derived at 712 or received at 716), the source network node 704 may determine to handover the UE 702 to the target network node 706. based on determining to handover the UE 702 to the target network node 706, at 720, the source network node 704 may transmit a first handover request to the first target network node 706 and a second handover request to the second target network node 707 via the Xn/X2 interface. Here, the first and second handover requests at 720 may indicate the handover information associated with the UE 702 and the source network node 704, and furthermore, may include the at least one mobility related prediction associated with the UE 702 (e.g., derived at 712 or received at 716).

At 730, the first target network node 706 may derive the first mobility related prediction associated with the target network node 706. That is, the first target network node 706 may have the at least one neural network, and based on the handover request received from the source network node 704 at 720, the first target network node 706 may derive the first mobility related prediction associated with the target network node 706.

At 740, the first target network node 706 may transmit the handover request ACK in response to the handover request at 720. The handover request ACK may indicate the source network node 704 that the handover request is successfully transmitted to the target network node 707, and the target network node 707 may accept the handover of the UE 702 from the source network node 704. In one aspect, the first target network node 706 may transmit the first mobility related prediction associated with the first target network node 706 derived at 730 in the handover request ACK transmitted to the source network node 704 at 740. That is, the first target network node 706 may transmit the first mobility related prediction associated with the first target network node 706 derived at 730 to the source network node 704 in the handover request ACK at 740.

At 735, the second target network node 707 may derive the second mobility related prediction associated with the target network node 707. That is, the second target network node 707 may have the at least one neural network, and based on the handover request received from the source network node 704 at 720, the second target network node 707 may derive the second mobility related prediction associated with the target network node 707.

At 742, the second target network node 707 may transmit the handover request ACK in response to the handover request at 720. The handover request ACK may indicate the source network node 704 that the handover request is successfully transmitted to the target network node 707, and the target network node 707 may accept the handover of the UE 702 from the source network node 704. In one aspect, the second target network node 707 may transmit the second mobility related prediction associated with the second target network node 707 derived at 735 in the handover request ACK transmitted to the source network node 704 at 742. That is, the second target network node 707 may transmit the second mobility related prediction associated with the second target network node 707 derived at 735 to the source network node 704 in the handover request ACK at 742.

In one aspect, the source network node 704 may take the first and second mobility related predictions associated with the first target network node 706 and the second target network node 707 obtained at 740 and 742 into consideration to perform the handover of the UE 702 from the source network node 704 to the first target network node 706 and the second target network node 707. That is, based on the first and second mobility related predictions associated with the first target network node 706 and the second target network node 707, e.g., at least one of predictions of network resource capacity, including PRB/TNL, or an achievable QoS/QoE at the first target network node 706 and the second target network node 707 after the handover, to determine that the first target network node 706 is more suitable to handover the UE 702 from the source network node 704. For example, if the achievable QoS at the first target network node 706 may better support the active call of the UE 702 than the second target network node 707, the source network node 704 may determine to handover the UE 702 to the first target network node 706 and not to the second target network node 707. Accordingly, the source network node 704 may receive the handover request ACK from the first target network node 706 and the second target network node 707 at 740 and 742, and transmit a handover command to the UE 702 at 750, instructing the UE 702 to switch to the first target network node 706 and the second target network node 707 to perform the handover of the UE 702 from the source network node 704 to the first target network node 706 and the second target network node 707.

In some aspects, the UE may evaluate the handover conditions and determine the first target network node 706 for the handover procedure. At 752, the UE 702 may determine to switch to the first target network node 706 among the first target network node 706 and the second target network node 707 based on the handover command received from the source network node 704. Here, determining to switch to the first target network node 706 may refer to selecting a target resource configuration associated with the first target network node 706. The target resource configuration associated with the first target network node 706 may include a first cell or a first target beam associated with the first target network node 706.

At 754, the UE 702 may transmit an RRC reconfiguration message to the first target network node 706 to establish a new RRC connection with the first target network node 706 to perform the handover of the UE 702 from the source network node 704 to the first target network node 706. The RRC message may include the indication of the target resource configuration associated with the first target network node 506.

In one aspect, the handover command received at 750 may include the at least one mobility related prediction associated with the UE 702 derived at 712. That is, if the UE 702 did not derive the at least one mobility related prediction associated with the UE 702 at 714, the source network node 704 may send the at least one mobility related prediction associated with the UE 702, e.g., at least one of the UE trajectory prediction, the UE 702 traffic prediction, the RRM measurement prediction, or the UE 702 location and mobility status, in the handover command 750, and the UE 702 may obtain the at least one mobility related prediction associated with the UE 702. The UE 702 may determine to switch to the target network node 706 based at least in part on the at least one mobility related prediction associated with the UE 702 received in the handover command at 750.

In another aspect, the handover command received at 750 may not include the at least one mobility related prediction associated with the UE 702, and the UE 702 may use the at least one mobility related prediction associated with the UE 702 derived at 714 to determine whether to switch to the target network node 706 based at least in part on the at least one mobility related prediction associated with the UE 702 derived at 714.

In another aspect, the handover command received at 750 may also include the mobility related prediction associated with the first target network node 706 and the second target network node 707 as derived at 730 and 735. That is, the source network node 704 may send, in the handover command at 750, the first and second mobility related predictions associated with the first target network node 706 and the second target network node 707, e.g., at least one of predictions of network resource capacity, including PRB/TNL, or an achievable QoS/QoE at the first target network node 706 and the second target network node 707 after the handover, and the UE 702 may determine whether to switch to the first target network node 706 and the second target network node 707 based at least in part on the first and second mobility related predictions associated with the first target network node 706 and the second target network node 707 received in the handover command at 750.

The UE may include a machine learning model for selecting the first target network node 706 from the multiple target network nodes triggered for handover procedure. That is, the handover conditions at 752 may be evaluated by the machine learning model. In one example, an input of the machine learning may include at least one of radio measurements, assistance information from the source network node, location/motion sensor measurements of the UE, and an output of the machine learning may include at least one of a target cell to trigger the handover, a target cell to execute the handover, or target cells to measure.

The machine learning model may be configured by the source network node 704. That is, the source network node 704 may include at least one parameter for the machine learning model of the UE to select a first target network node from the at least one target network node in the handover command at 750.

Figure 8:
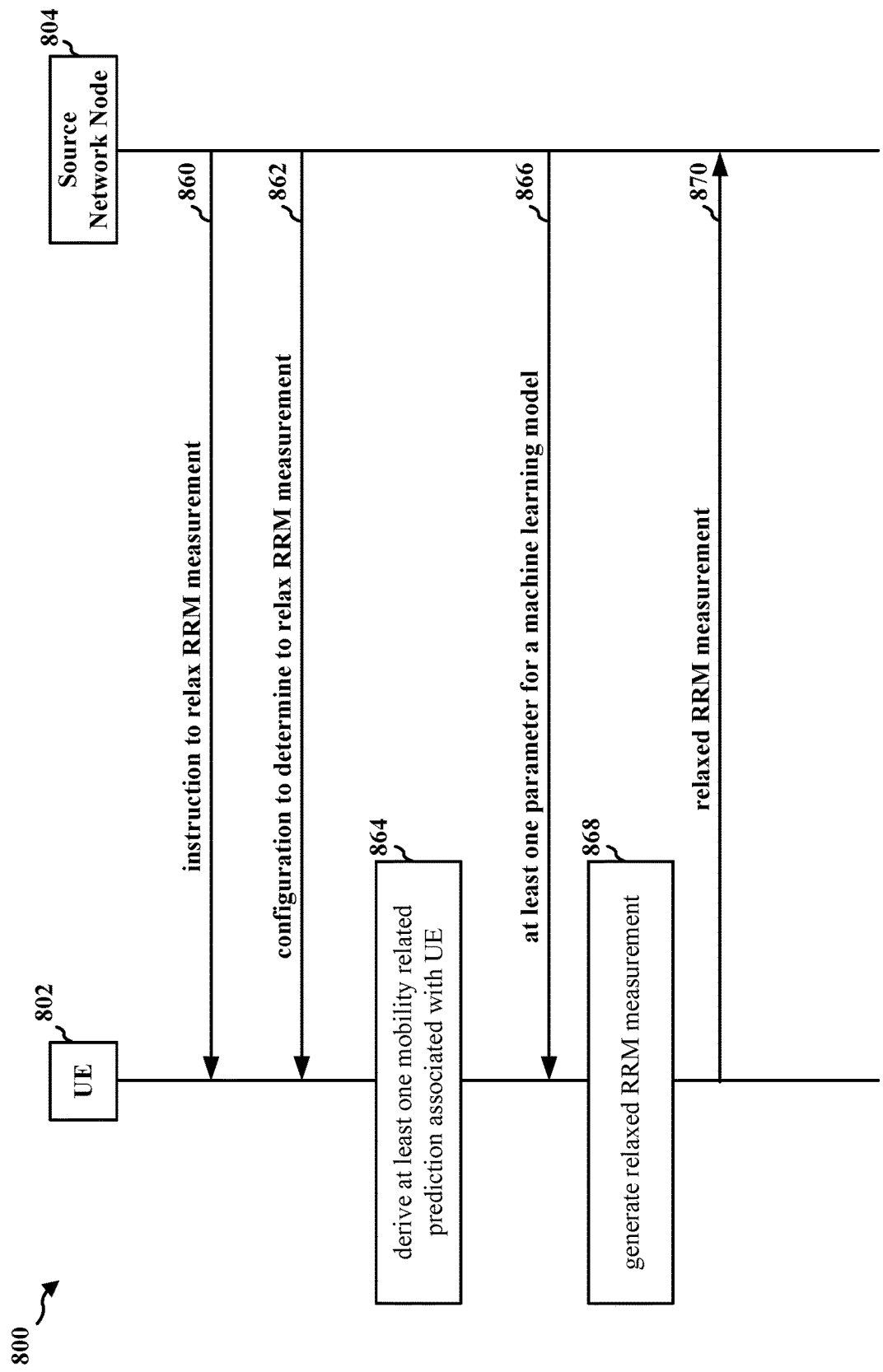
FIG. 8 is call-flow of a radio resource management (RRM) measurement relaxation.

FIG. 8 is call-flow 800 of an RRM measurement relaxation. The call-flow 800 may include a UE 802 and a source network node 804. The source network node 804 may configure the RRM relaxing for the UE to relax the RRM measurements based on at least one mobility related prediction associated with the UE, and the UE may relax at least one configuration of the RRM measurements based on the at least one mobility related prediction.

At 860, the source network node may configure the RRM relaxing for the UE to different measurement object based on the at least one mobility related prediction associated with the UE. Here, the at least one configuration of the RRM measurement to be relaxed may include at least one of a sampling rate, filtering coefficients, reporting configuration, etc.

At 862, the source network node may configure the UE to decide whether to perform the RRM relaxing based on the UE's prediction on trajectory. That is, the source network node may transmit the configuration to the UE to determine to relax at least one parameter of the RRM measurement for each of the at least one target network node at the UE, and the UE may receive the configuration from the source network node to determine to relax at least one parameter of the RRM measurement for each of the at least one target network node at the UE based on the at least one mobility related prediction associated with the UE. In one example, the source network node may configure relaxing policy to UE, e.g., different relaxing level for different target arrival. In another example, the source network node may also configure the RRM relaxing boundary based on its own prediction.

In one aspect, the source network node may allow the UE to use RRM prediction for some measurement object. That is, the source network node may instruct the UE to determine the RRM measurement relaxing based on the at least one mobility related prediction associated with the UE derived at 864. In one aspect, the permission may be configured separately for different scenarios. That is, the source network node may configure different configurations for the UE's RRM measurement based on the different scenarios. For example, the source network node may configure the UE with a first configuration of a regular RRM measurement based on the UE being in the RRCCONNECTED mode, a second configuration of the RRM measurement for the UE being in the RRCIDLE mode or RRCINACTIVE mode, a third configuration of the RRM measurement for triggering or executing the CHO. Furthermore, the RRM measurement may be differently configured for inter-RAT or inter-frequency RRM measurement.

At 864, the UE 802 may derive the at least one mobility related prediction associated with the UE 802 using the at least one neural network of the UE 802. That is, the UE 802 may have the at least one neural network and the UE 802 may use the at least one neural network to derive the at least one mobility related prediction associated with the UE 802. The at least one mobility related prediction associated with the UE may include at least one of the UE trajectory prediction, the UE traffic prediction, the RRM measurement prediction, or the UE location and mobility status At 866, the source network node may configure a machine learning model for the UE to decide RRM prediction and relaxing. That is, the UE may include a machine learning model for predicting or relaxing the RRM measurement, and the source network node may configure the machine learning model of the UE for predicting or relaxing the RRM measurement.

At 868, the UE may generate the relaxed RRM measurement. In one aspect, the UE may generate the relaxed RRM measurement based on the configuration to the UE to determine to relax at least one parameter of the RRM measurement for each of the at least one target network node at the UE as received at 862. In another aspect, the UE may generate the relaxed RRM measurement based on the at least one mobility related prediction associated with the UE derived at 864.

In another aspect, the output of the machine learning model for generating the relaxed RRM measurement may include at least one of predicted RRM measurement results or recommended target network nodes to measure and RRM relax level for each of the target network nodes. Here, the at least one of predicted RRM measurement results or recommended target network nodes may be derived based on the configuration of the machine learning model for the UE received at 866.

At 870, the UE may transmit the relaxed RRM measurement. The relaxed RRM measurement may refer to the RRM measurement with at least one configuration being relaxed. The at least one configuration of the RRM measurement to be relaxed may include at least one of a sampling rate, filtering coefficients, reporting configuration, etc.

In one aspect, the UE may generate the relaxed RRM measurement based on the configuration to the UE to determine to relax at least one parameter of the RRM measurement for each of the at least one target network node at the UE as received at 862. In another aspect, the UE may generate the relaxed RRM measurement based on the at least one mobility related prediction associated with the UE derived at 864.

Figure 9:
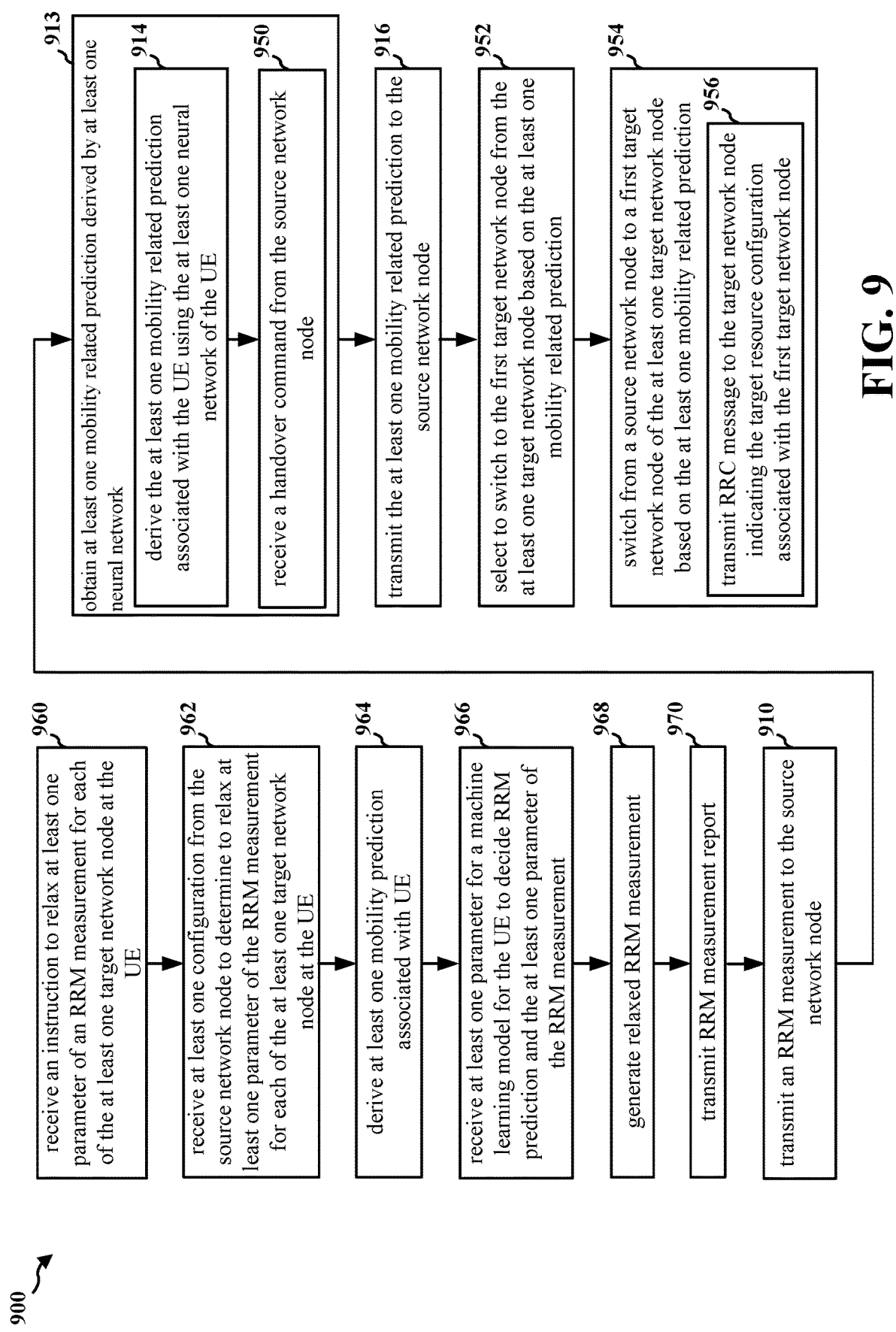
FIG. 9 is a flowchart of a method of wireless communication.

In another aspect, the output of the machine learning model for generating the relaxed RRM measurement may include at least one of predicted RRM measurement results or recommended target network nodes to measure and RRM relax level for each of the target network nodes. Here, the UE may include at least one flag indicating a predicted result and/or a confidence level in the measurement report for UE to indicate the reported measurement result is based on prediction, instead of the real RRM measurement. That is, the RRM measurement may be based on the prediction of the mobility or a confidence level of the prediction FIG. 9 is a flowchart 900 of a method of wireless communication. The method may be performed by a UE (e.g., the UE 104/502/602/702/802; the apparatus 1504). The UE may be configured to obtain at least one mobility related prediction associated with the UE or at least one target network node, the at least one mobility related prediction being derived by at least one neural network, and switch from a source network node to a first target network node of the at least one target network node based on the at least one mobility related prediction.

At 960, the UE may receive an instruction to relax at least one parameter of an RRM measurement for each of the at least one target network node at the UE. For example, at 860, the UE 802 may receive an instruction to relax at least one parameter of an RRM measurement for each of the at least one target network node at the UE. Furthermore, 960 may be performed by the AI/ML based mobility related prediction component 198.

At 962, the UE may receive at least one configuration from the source network node to determine to relax at least one parameter of the RRM measurement for each of the at least one target network node at the UE. Here, the at least one configuration may be associated with at least one measurement object of the UE. For example, at 862, the UE 802 may receive at least one configuration from the source network node to determine to relax at least one parameter of the RRM measurement for each of the at least one target network node at the UE. Furthermore, 962 may be performed by the AI/ML based mobility related prediction component 198.

At 964, the UE may derive at least one mobility related prediction associated with UE. For example, at 864, the UE 802 may derive at least one mobility related prediction associated with UE. Furthermore, 964 may be performed by the AI/ML based mobility related prediction component 198.

At 966, the UE may receive at least one parameter for a machine learning model for the UE to decide RRM prediction and the at least one parameter of the RRM measurement. For example, at 866, the UE 802 may receive at least one parameter for a machine learning model for the UE to decide RRM prediction and the at least one parameter of the RRM measurement. Furthermore, 966 may be performed by the AI/ML based mobility related prediction component 198.

At 968, the UE may generate the relaxed RRM measurement. For example, at 868, the UE 802 may generate the relaxed RRM measurement. Furthermore, 968 may be performed by the AI/ML based mobility related prediction component 198.

At 970, the UE may transmit a relaxed RRM measurement report. Here, the relaxed RRM measurement report may include at least one flag indicating that the RRM measurement is based on the prediction of the mobility or a confidence level of the prediction. For example, at 870, the UE 802 may transmit an RRM measurement report. Furthermore, 970 may be performed by the AI/ML based mobility related prediction component 198.

At 910, the UE may transmit an RRM measurement to the source network node. For example, at 510/610/710, the UE 502/602/702 may transmit an RRM measurement to the source network node. Furthermore, 910 may be performed by the AI/ML based mobility related prediction component 198.

At 913, the UE may obtain at least one mobility related prediction associated with the UE or at least one target network node, the at least one mobility related prediction being derived by at least one neural network. In one example, the at least one mobility related prediction associated with the UE may include at least one of a UE trajectory prediction, a UE traffic prediction, an RRM measurement prediction, or a UE location and mobility status. In another example, the at least one mobility related prediction associated with the at least one target network node may include at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the UE deriving the at least one mobility related prediction associated with the UE using the at least one neural network of the UE. In another aspect, the at least one mobility related prediction associated with the UE or at least one target network node may be received from the source network node. The at least one mobility related prediction associated with the UE or at least one target network node may be received in a handover command from the source network node. 913 may include 914 and 950. For example, 953 may be performed by the AI/ML based mobility related prediction component 198.

At 914, the UE may derive the at least one mobility related prediction associated with the UE using the at least one neural network of the UE. For example, at 514/614/714, the UE 502/602/702 may derive the at least one mobility related prediction associated with the UE using the at least one neural network of the UE. Furthermore, 914 may be performed by the AI/ML based mobility related prediction component 198.

At 950, the UE may receive a handover command from the source network node. Here, the handover command may include the at least one mobility related prediction, and the handover command may include at least one parameter for a machine learning model of the UE to select the first target network node from the at least one target network node. For example, at 550/650/750, the UE 502/602/702 may receive a handover command from the source network node. Furthermore, 950 may be performed by the AI/ML based mobility related prediction component 198.

At 916, the UE may transmit the at least one mobility related prediction to the source network node. For example, at 516/616/716, the UE 502/602/702 may transmit the at least one mobility related prediction to the source network node. Furthermore, 916 may be performed by an AI/ML based mobility related prediction component 198.

At 952, the UE may select to switch to the first target network node from the at least one target network node based on the at least one mobility related prediction. The UE may select to switch to the target network node based on selecting a target resource configuration associated with the target network node. The target resource configuration associated with the target network node may include a first cell or a target beam associated with the target network node. Here, the UE may select to switch to the first target network node from the at least one target network node based on the machine learning model. An input of the machine learning model includes at least one of radio measurements, assistance information from the source network node, location/motion sensor measurements of the UE, and an output of the machine learning model includes at least one of a target cell to trigger the handover, a target cell to execute the handover, or target cells to measure. For example, at 552/652/752, the UE 502/602/702 may select to switch to the first target network node from the at least one target network node based on the at least one mobility related prediction. Furthermore, 952 may be performed by the AI/ML based mobility related prediction component 198.

At 954, the UE may switch from the source network node to the first target network node of the at least one target network node based on the at least one mobility related prediction. 954 may include 956. At 954, the UE may transmit an RRC reconfiguration message to the target network node to establish a new RRC connection with the target network node to perform the handover of the UE from the source network node to the target network node. The RRC message may include the indication of the target resource configuration associated with the first target network node. For example, at 554/654/754, the UE 502/602/702 may switch from the source network node to the first target network node of the at least one target network node based on the at least one mobility related prediction. Furthermore, 954 and 956 may be performed by the AI/ML based mobility related prediction component 198.

Figure 10:
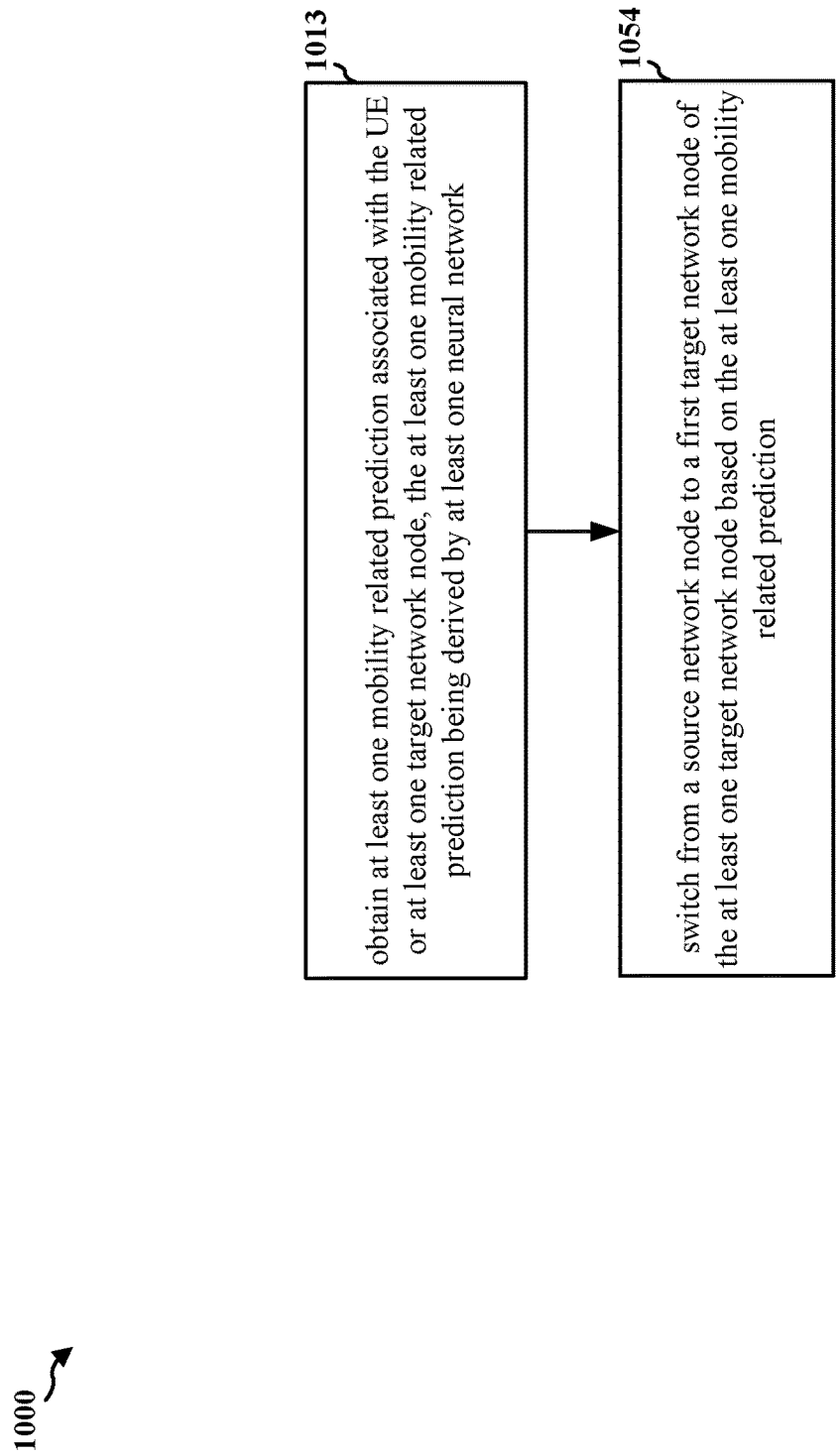
FIG. 10 is a flowchart of a method of wireless communication.

FIG. 10 is a flowchart 1000 of a method of wireless communication. The method may be performed by a UE (e.g., the UE 104/502/602/702/802; the apparatus 1504). The UE may be configured to obtain at least one mobility related prediction associated with the UE or at least one target network node, the at least one mobility related prediction being derived by at least one neural network, and switch from the source network node to the first target network node of the at least one target network node based on the at least one mobility related prediction.

At 1013, the UE may obtain at least one mobility related prediction associated with the UE or at least one target network node, the at least one mobility related prediction being derived by at least one neural network. In one example, the at least one mobility related prediction associated with the UE may include at least one of a UE trajectory prediction, a UE traffic prediction, an RRM measurement prediction, or a UE location and mobility status. In another example, the at least one mobility related prediction associated with the at least one target network node may include at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the UE deriving the at least one mobility related prediction associated with the UE using the at least one neural network of the UE. In another aspect, the at least one mobility related prediction associated with the UE or at least one target network node may be received from the source network node. The at least one mobility related prediction associated with the UE or at least one target network node may be received in a handover command from the source network node. For example, 1013 may be performed by the AI/ML based mobility related prediction component 198.

At 1054, the UE may switch from the source network node to the first target network node of the at least one target network node based on the at least one mobility related prediction. Here, the first target network node may be associated with a target resource configuration selected based on the at least one mobility related prediction. The target resource configuration associated with the target network node may include a first cell or a target beam associated with the target network node. The UE may transmit an RRC reconfiguration message to the target network node to establish a new RRC connection with the target network node to perform the handover of the UE from the source network node to the target network node. The RRC message may include the indication of the target resource configuration associated with the first target network node. For example, at 554/654/754, the UE 502/602/702 may switch from the source network node to the first target network node of the at least one target network node based on the at least one mobility related prediction. Furthermore, 1054 may be performed by the AI/ML based mobility related prediction component 198.

Figure 11:
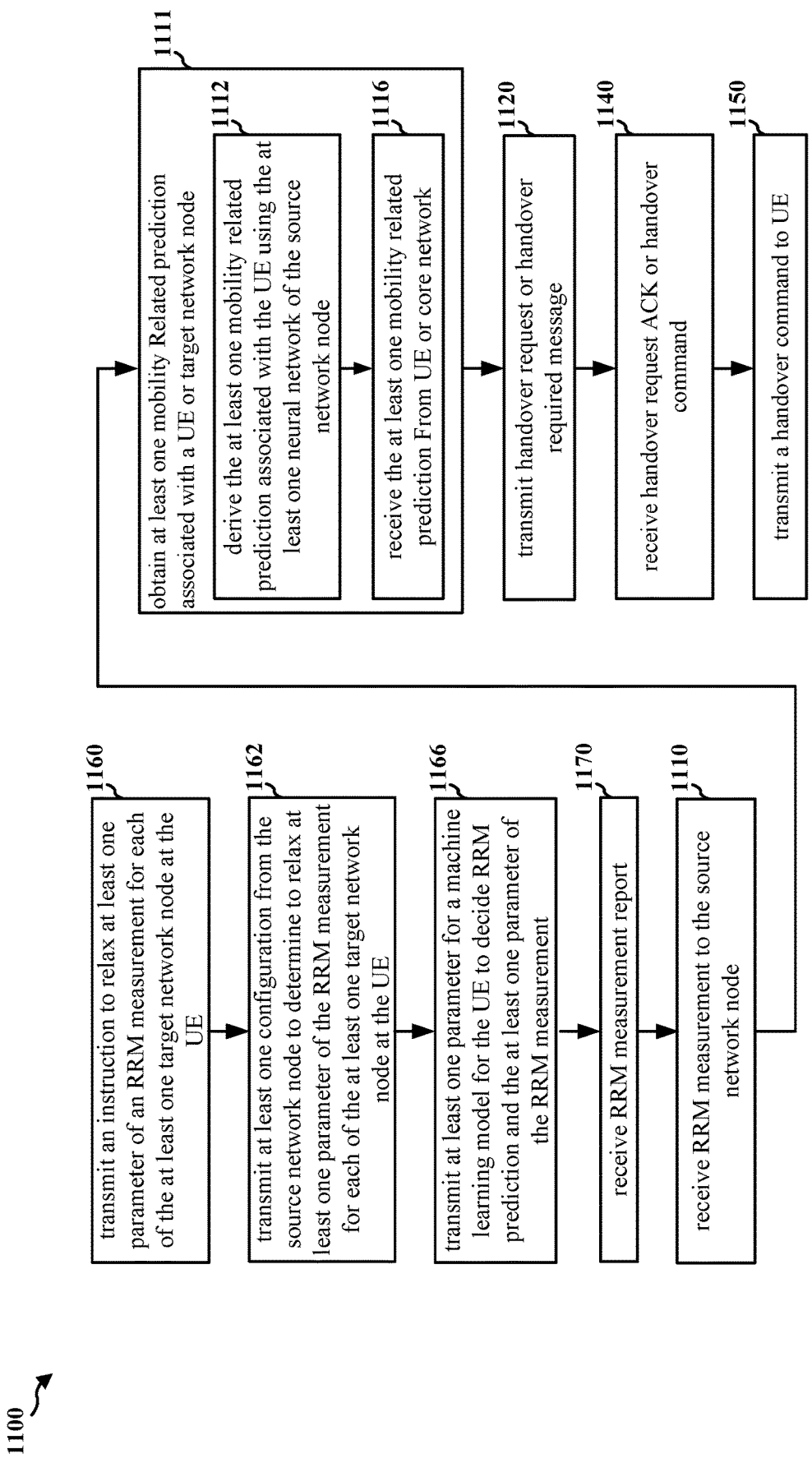
FIG. 11 is a flowchart of a method of wireless communication.

FIG. 11 is a flowchart 1100 of a method of wireless communication. The method may be performed by a source network node (e.g., the base station 102; the source network node 504/604/704/804; the network entity 1602). The source network node may be configured to obtain at least one mobility related prediction associated with a UE or at least one target network node, the at least one mobility related prediction being derived by at least one neural network, and handover the UE from the source network node to the at least one target network node based on the at least one mobility related prediction.

At 1160, the source network node may transmit an instruction to relax at least one parameter of an RRM measurement for each of the at least one target network node at the UE. For example, at 860, the source network node 804 may transmit an instruction to relax at least one parameter of an RRM measurement for each of the at least one target network node at the UE. Furthermore, 1160 may be performed by a AI/ML based mobility predicting component 199.

At 1162, the source network node may transmit at least one configuration from the source network node to determine to relax at least one parameter of the RRM measurement for each of the at least one target network node at the UE. Here, the at least one configuration may be associated with at least one measurement object of the UE. For example, at 862, the source network node 804 may transmit at least one configuration from the source network node to determine to relax at least one parameter of the RRM measurement for each of the at least one target network node at the UE. Furthermore, 1162 may be performed by a AI/ML based mobility predicting component 199.

At 1166, the source network node may transmit at least one parameter for a machine learning model for the UE to decide RRM prediction and the at least one parameter of the RRM measurement. For example, at 866, the source network node 804 may transmit at least one parameter for a machine learning model for the UE to decide RRM prediction and the at least one parameter of the RRM measurement. Furthermore, 1166 may be performed by a AI/ML based mobility predicting component 199.

At 1170, the source network node may receive a relaxed RRM measurement report. Here, the relaxed RRM measurement report may include at least one flag indicating that the RRM measurement is based on the prediction of the mobility or a confidence level of the prediction. For example, at 870, the source network node 804 may receive a relaxed RRM measurement report. Furthermore, 1170 may be performed by a AI/ML based mobility predicting component 199.

At 1110, the source network node may receive an RRM measurement to the source network node. For example, at 510/610/710, the source network node 504/604/704 may receive an RRM measurement to the source network node. Furthermore, 1110 may be performed by the AI/ML based mobility predicting component 199.

At 1111, the source network node may obtain at least one mobility related prediction associated with a UE or at least one target network node, the at least one mobility related prediction being derived by at least one neural network. In one example, the at least one mobility related prediction may be associated with the UE and includes at least one of a UE trajectory prediction, a UE traffic prediction, an RRM measurement prediction, or a UE location and mobility status. In another example, the at least one mobility related prediction may be associated with the at least one target network node and includes at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the source network node deriving the at least one mobility related prediction associated with the UE using the at least one neural network of the source network node. In another aspect, the at least one mobility related prediction associated with the UE may be received from the UE at 1116. In another aspect, the at least one mobility related prediction associated with at least one target network node may be received from the target network node or from the core network at 1140. 1111 may include 1112 and 1116. For example, 1111 may be performed by the AI/ML based mobility predicting component 199.

At 1112, the source network node may derive the at least one mobility related prediction associated with the UE using the at least one neural network of the source network node. For example, at 512/612/712, the source network node 504/604/704 may derive the at least one mobility related prediction associated with the UE using the at least one neural network of the source network node. Furthermore, 1112 may be performed by the AI/ML based mobility predicting component 199.

At 1116, the source network node may receive, from the UE, the at least one mobility related prediction associated with the UE, the at least one mobility related prediction associated with the UE being derived by the at least one neural network of the UE. For example, at 516/616/716, the source network node 504/604/704 may receive, from the UE, the at least one mobility related prediction associated with the UE. Furthermore, 1116 may be performed by a AI/ML based mobility predicting component 199.

At 1120, the source network node may transmit a handover message including the at least one mobility related prediction associated with the UE. In one example, the handover message may be a handover request transmitted to the target network node. In another example, the handover message may be a handover required message transmitted to the core network. The at least one mobility related prediction associated with the UE may be included in a container, e.g., source to target transparent container IE, to the target network node, and the handover required message transmitted to the core network may include the container including the at least one mobility related prediction associated with the UE. For example, at 520/620/720, the source network node 504/604/704 may transmit a handover message including the at least one mobility related prediction associated with the UE. Furthermore, 1120 may be performed by a AI/ML based mobility predicting component 199.

At 1140, the source network node may receive a handover request ACK or a handover command. In one example, based on transmitting the handover request to the target network node, the source network node may receive the handover request ACK from the target network node. In another example, based on transmitting the handover required message to the core network, the source network node may receive the handover command from the core network. The at least one mobility related prediction associated with the at least one target network node may be included in a container, e.g., target to source transparent container IE, from the target network node, and the handover command received from the core network may include the container including the at least one mobility related prediction associated with the at least one target network node. For example, at 540/640/740, the source network node 504/604/704 may receive a handover request ACK or a handover command. Furthermore, 1140 may be performed by a AI/ML based mobility predicting component 199.

At 1150, the source network node may transmit a handover command to UE. Here, the handover command may include the at least one mobility related prediction, and the handover command may include at least one parameter for a machine learning model of the UE to select the first target network node from the at least one target network node. For example, at 550/550/650/750, the source network node 504/604/704 may transmit a handover command to UE. Furthermore, 1150 may be performed by a AI/ML based mobility predicting component 199.

Figure 12:
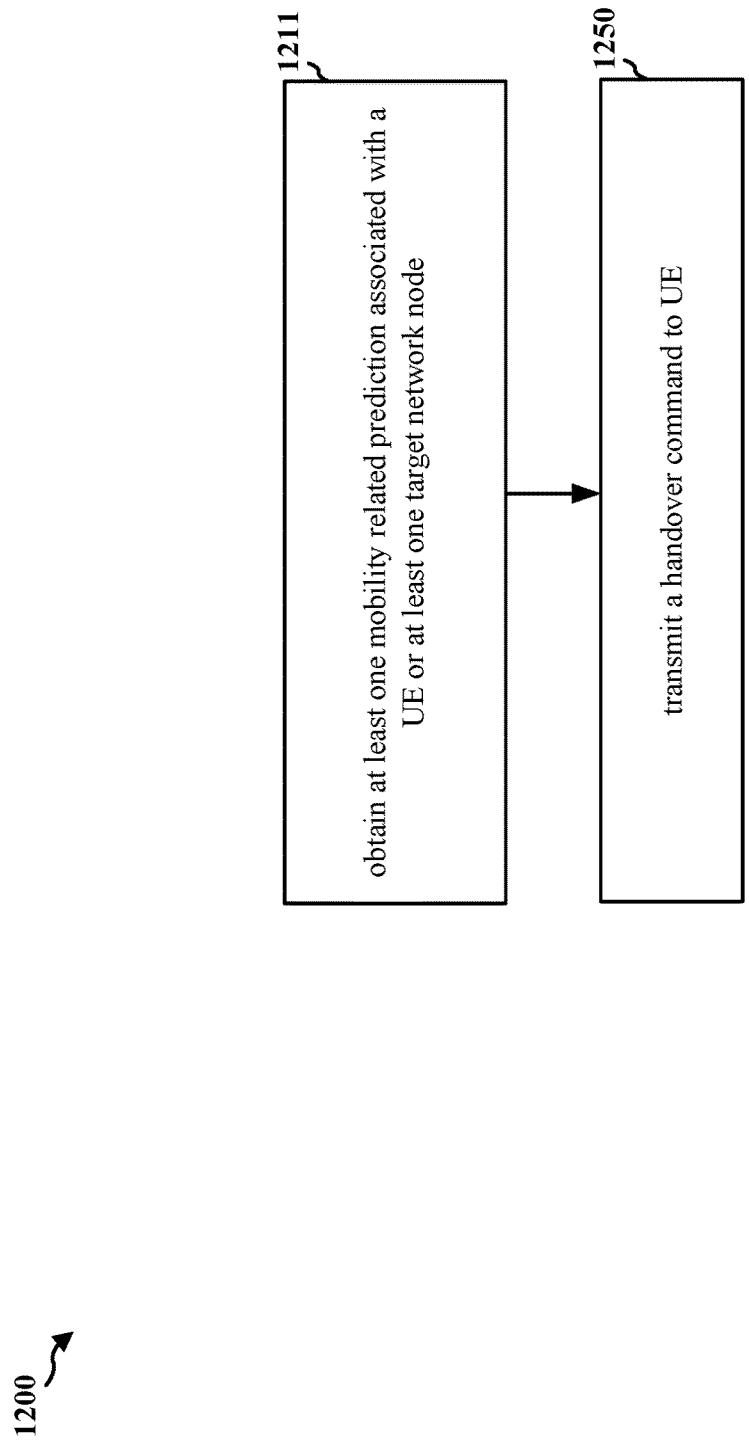
FIG. 12 is a flowchart of a method of wireless communication.

FIG. 12 is a flowchart 1200 of a method of wireless communication. The method may be performed by a source network node (e.g., the base station 102; the source network node 504/604/704/804; the network entity 1602). The source network node may be configured to obtain at least one mobility related prediction associated with a UE or at least one target network node, the at least one mobility related prediction being derived by at least one neural network, and handover the UE from the source network node to the at least one target network node based on the at least one mobility related prediction.

At 1211, the source network node may obtain at least one mobility related prediction associated with a UE or at least one target network node, the at least one mobility related prediction being derived by at least one neural network. In one example, the at least one mobility related prediction may be associated with the UE and includes at least one of a UE trajectory prediction, a UE traffic prediction, an RRM measurement prediction, or a UE location and mobility status. In another example, the at least one mobility related prediction may be associated with the at least one target network node and includes at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the source network node deriving the at least one mobility related prediction associated with the UE using the at least one neural network of the source network node. In another aspect, the at least one mobility related prediction associated with the UE may be received from the UE at 1216. In another aspect, the at least one mobility related prediction associated with at least one target network node may be received from the target network node or from the core network at 1240. 1211 may include 1212 and 1216. For example, 1211 may be performed by the AI/ML based mobility predicting component 199.

At 1250, the source network node may transmit a handover command to UE. Here, the handover command may include the at least one mobility related prediction, and the handover command may include at least one parameter for a machine learning model of the UE to select the first target network node from the at least one target network node. For example, at 550/550/650/750, the source network node 504/604/704 may transmit a handover command to UE. Furthermore, 1250 may be performed by a AI/ML based mobility predicting component 199.

Figure 13:
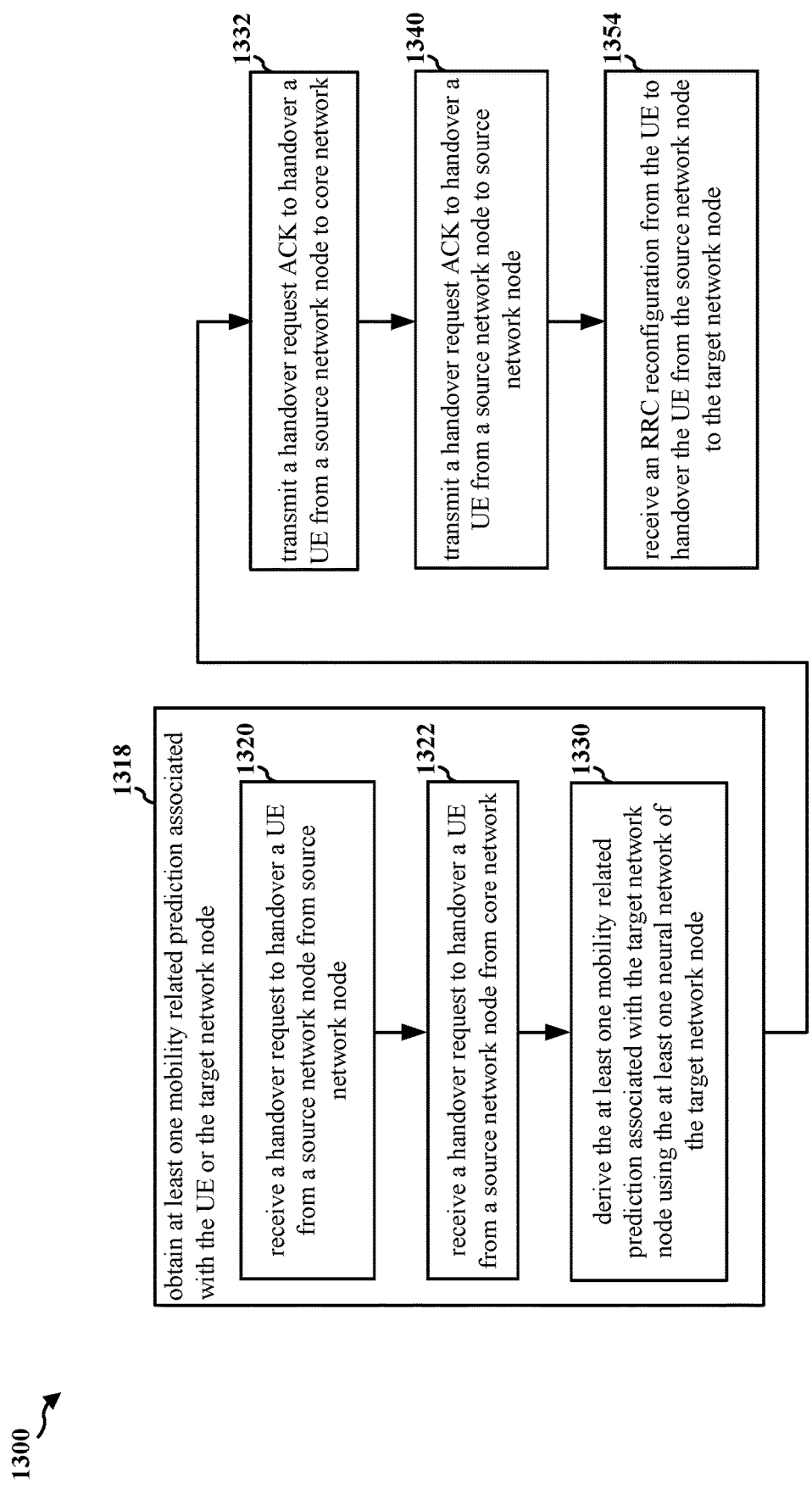
FIG. 13 is a flowchart of a method of wireless communication.

FIG. 13 is a flowchart 1300 of a method of wireless communication. The method may be performed by a target network node (e.g., the base station 102; the target network node 506/606/706/707; the network entity 1602). The target network node may be configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction.

At 1318, the target network node may obtain at least one mobility related prediction associated with the UE or the target network node, the at least one mobility related prediction being derived by at least one neural network. In one example, the at least one mobility related prediction associated with the UE may include at least one of a UE trajectory prediction, a UE traffic prediction, an RRM measurement prediction, or a UE location and mobility status. In another example, the at least one mobility related prediction associated with the at least one target network node may include at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the target network node receiving the at least one mobility related prediction associated with the UE from the source network node. In another aspect, the at least one mobility related prediction associated with the target network node may be obtained by the target network deriving the at least one mobility related prediction associated with the target network node using the at least one neural network of the target network node. 1318 may include 1320, 1322, and 1330. For example, 1318 may be performed by the AI/ML based mobility predicting component 199.

At 1320, the target network node may receive a handover request from the source network node to handover a UE from a source network node to the target network node. For example, at 520/720, the target network node 506/706/707 may receive a handover request from the source network node to handover a UE from a source network node to the target network node. Furthermore, 1320 may be performed by the AI/ML based mobility predicting component 199.

At 1322, the target network node may receive a handover request from the core network to handover a UE from a source network node to the target network node. The at least one mobility related prediction associated with the UE may be included in a container, e.g., source to target transparent container IE, from the source network node, and the handover request received from the core network may include the container including the at least one mobility related prediction associated with the UE. For example, at 622, the target network node 606 may receive a handover request from the core network to handover a UE from a source network node to the target network node. Furthermore, 1322 may be performed by the AI/ML based mobility predicting component 199.

At 1330, the target network node may derive the at least one mobility related prediction associated with the target network node using the at least one neural network of the target network node. For example, at 530/630/730, the target network node 506/606/706/707 may derive the at least one mobility related prediction associated with the target network node using the at least one neural network of the target network node. Furthermore, 1330 may be performed by the AI/ML based mobility predicting component 199.

At 1332, the target network node may transmit a handover request ACK to handover a UE from a source network node to core network. The at least one mobility related prediction associated with the at least one target network node may be included in a container, e.g., target to source transparent container IE, to the source network node, and the handover request ACK transmitted to the core network may include the container including the at least one mobility related prediction associated with the at least one target network node. For example, at 532/632/732, the target network node 506/606/706/707 may transmit a handover request ACK to handover a UE from a source network node to core network. Furthermore, 1332 may be performed by the AI/ML based mobility predicting component 199.

At 1340, the target network node may transmit a handover request ACK to handover a UE from a source network node to source network node. For example, at 540/640/740, the target network node 506/606/706/707 may transmit a handover request ACK to handover a UE from a source network node to source network node. Furthermore, 1340 may be performed by the AI/ML based mobility predicting component 199.

At 1354, the target network node may receive an RRC reconfiguration from the UE to handover the UE from the source network node to the target network node. For example, at 554/654/754, the target network node 506/606/706/707 may receive an RRC reconfiguration from the UE to handover the UE from the source network node to the target network node. Furthermore, 1354 may be performed by the AI/ML based mobility predicting component 199.

Figure 14:
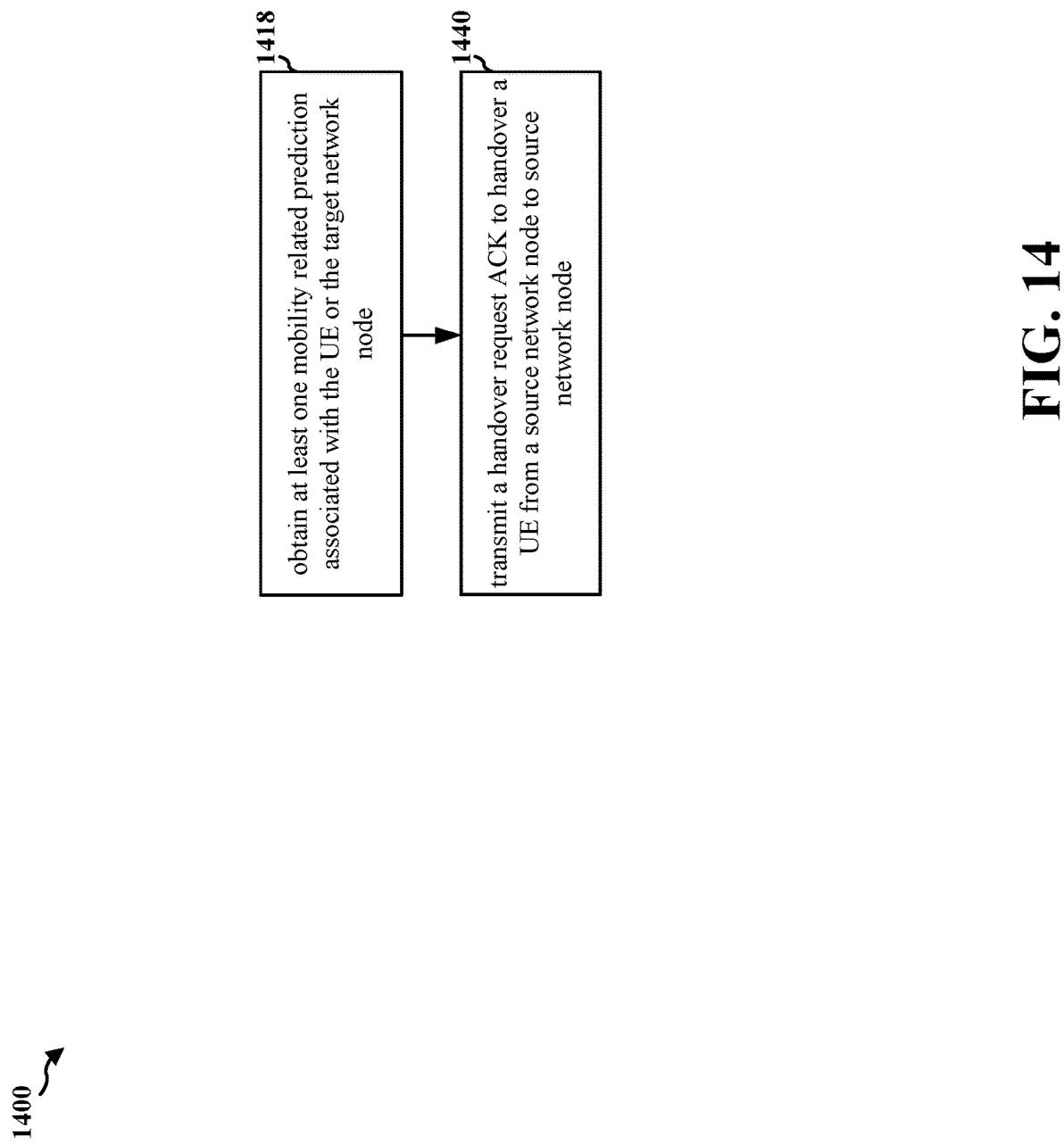
FIG. 14 is a flowchart of a method of wireless communication.

FIG. 14 is a flowchart 1400 of a method of wireless communication. The method may be performed by a target network node (e.g., the base station 102; the target network node 506/606/706/707; the network entity 1602). The target network node may be configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction.

At 1418, the target network node may obtain at least one mobility related prediction associated with the UE or the target network node, the at least one mobility related prediction being derived by at least one neural network. In one example, the at least one mobility related prediction associated with the UE may include at least one of a UE trajectory prediction, a UE traffic prediction, an RRM measurement prediction, or a UE location and mobility status. In another example, the at least one mobility related prediction associated with the at least one target network node may include at least one of predictions of network resource capacity, including PRB/TNL, or an achievable QoS/QoE at the at least one target network node after a handover of the UE from the source network node to the target network node. In one aspect, the at least one mobility related prediction associated with the UE may be obtained by the target network node receiving the at least one mobility related prediction associated with the UE from the source network node. In another aspect, the at least one mobility related prediction associated with the target network node may be obtained by the target network deriving the at least one mobility related prediction associated with the target network node using the at least one neural network of the target network node. 1418 may include 1420, 1422, and 1430. For example, 1418 may be performed by the AI/ML based mobility predicting component 199.

At 1440, the target network node may transmit a handover request ACK to handover a UE from a source network node to source network node. For example, at 540/640/740, the target network node 506/606/706/707 may transmit a handover request ACK to handover a UE from a source network node to source network node. Furthermore, 1440 may be performed by the AI/ML based mobility predicting component 199.

Figure 15:
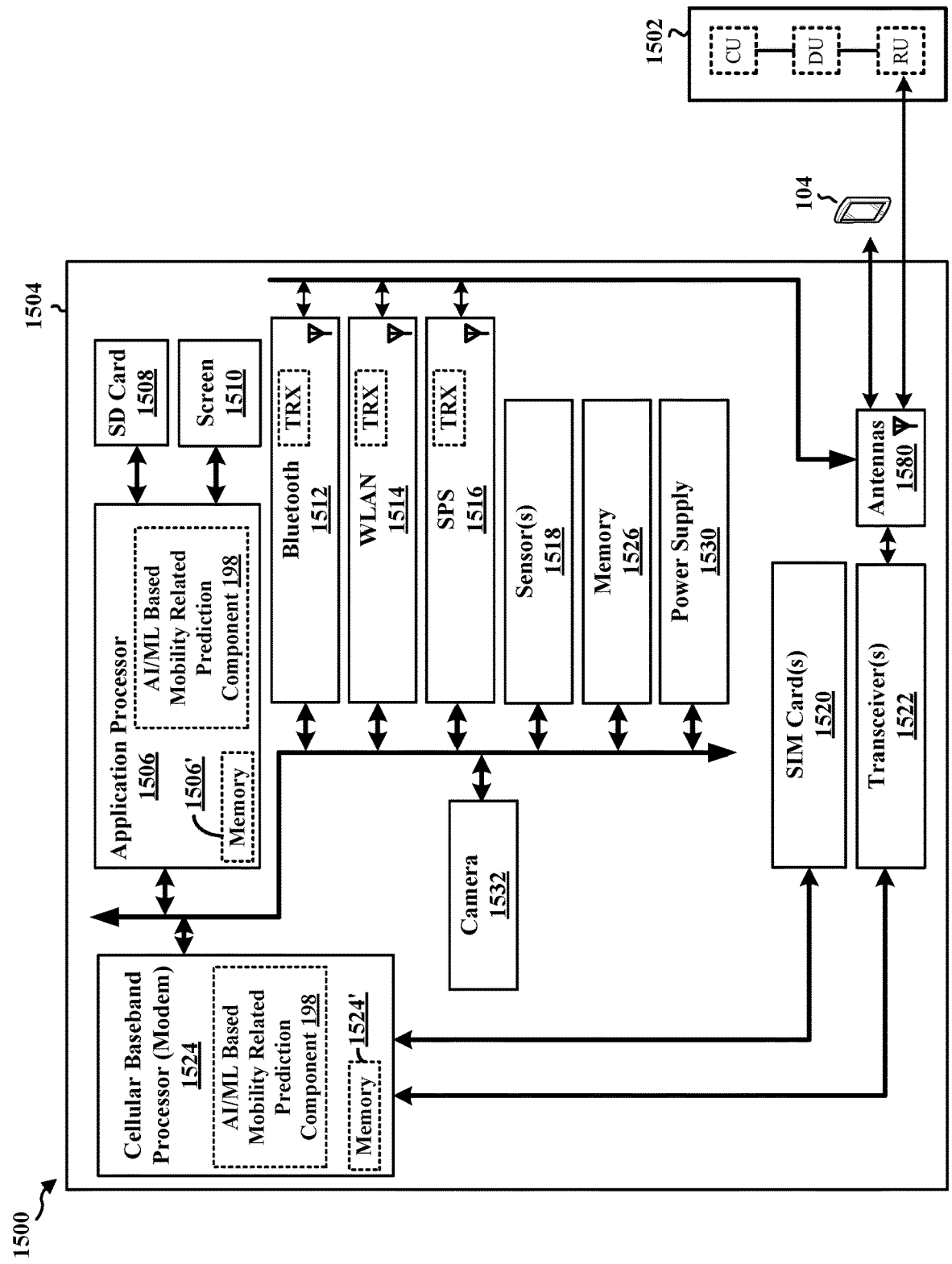
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see 350 of FIG. 3) and include the additional modules of the apparatus 1504.

As discussed supra, the AI/ML based mobility related prediction component 198 is configured to obtain at least one mobility related prediction associated with the UE or at least one target network node, the at least one mobility related prediction being derived by at least one neural network, and switch from a source network node to the first target network node of the at least one target network node based on the at least one mobility related prediction. The AI/ML based mobility related prediction component 198 may be within the cellular baseband processor 1524, the application processor 1506, or both the cellular baseband processor 1524 and the application processor 1506. The AI/ML based mobility related prediction component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for obtaining at least one mobility related prediction associated with the UE or at least one target network node, the at least one mobility related prediction being derived by at least one neural network, and means for switching from a source network node to a first target network node of the at least one target network node, the first target network node associated with a target resource configuration selected based on the at least one mobility related prediction. In one configuration, the at least one mobility related prediction is associated with the UE and includes at least one of a UE trajectory prediction, a UE traffic prediction, an RRM measurement prediction, or a UE location and mobility status, and where the means for obtaining the at least one mobility related prediction is further configured to derive the at least one mobility related prediction associated with the UE using the at least one neural network of the UE. In one configuration, the apparatus 1504, and in particular the cellular baseband processor 1524 and/or the application processor 1506, further includes means for transmitting the at least one mobility related prediction to the source network node. In one configuration, the at least one mobility related prediction is associated with the at least one target network node and includes at least one of predictions of network resource capacity, including PRB/TNL, or an achievable QoS/QoE at the at least one target network node after a handover of the UE from the source network node to the target network node, and the means for obtaining the at least one mobility related prediction further includes receiving, from the source network node, the at least one mobility related prediction associated with the at least one target network node. In one configuration, the apparatus 1504, and in particular the cellular baseband processor 1524 and/or the application processor 1506, further includes means for receiving a handover command from the source network node, the handover command including the at least one mobility related prediction. In one configuration, the apparatus 1504, and in particular the cellular baseband processor 1524 and/or the application processor 1506, further includes means for selecting to switch to the first target network node from the at least one target network node based on the at least one mobility related prediction. In one configuration, the apparatus 1504, and in particular the cellular baseband processor 1524 and/or the application processor 1506, further includes means for receiving a handover command for the UE, the handover command including at least one parameter for a machine learning model of the UE to select a first target network node from the at least one target network node, and means for selecting the target resource configuration associated with the first target network node from the at least one target network node based on the machine learning model, where an input of the machine learning model includes at least one of radio measurements, assistance information from the source network node, location/motion sensor measurements of the UE, and an output of the machine learning model includes at least one of a target cell to trigger the handover, a target cell to execute the handover, or target cells to measure. In one configuration, the apparatus 1504, and in particular the cellular baseband processor 1524 and/or the application processor 1506, further includes means for transmitting an RRC message to the target network node indicating the get resource configuration associated with the first target network node. In one configuration, the apparatus 1504, and in particular the cellular baseband processor 1524 and/or the application processor 1506, further includes means for receiving an instruction to relax at least one parameter of an RRM measurement for each of the at least one target network node at the UE. In one configuration, the apparatus 1504, and in particular the cellular baseband processor 1524 and/or the application processor 1506, further includes means for receiving at least one configuration from the source network node to determine to relax at least one parameter of the RRM measurement for each of the at least one target network node at the UE. In one configuration, the at least one configuration is associated with at least one measurement object of the UE. In one configuration, the apparatus 1504, and in particular the cellular baseband processor 1524 and/or the application processor 1506, further includes means for transmitting an RRM measurement report including at least one flag indicating that the RRM measurement is based on the prediction of the mobility or a confidence level of the prediction. In one configuration, the apparatus 1504, and in particular the cellular baseband processor 1524 and/or the application processor 1506, further includes means for receiving at least one parameter for a machine learning model for the UE to decide RRM prediction and the at least one parameter of the RRM measurement. The means may be the AI/ML based mobility related prediction component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
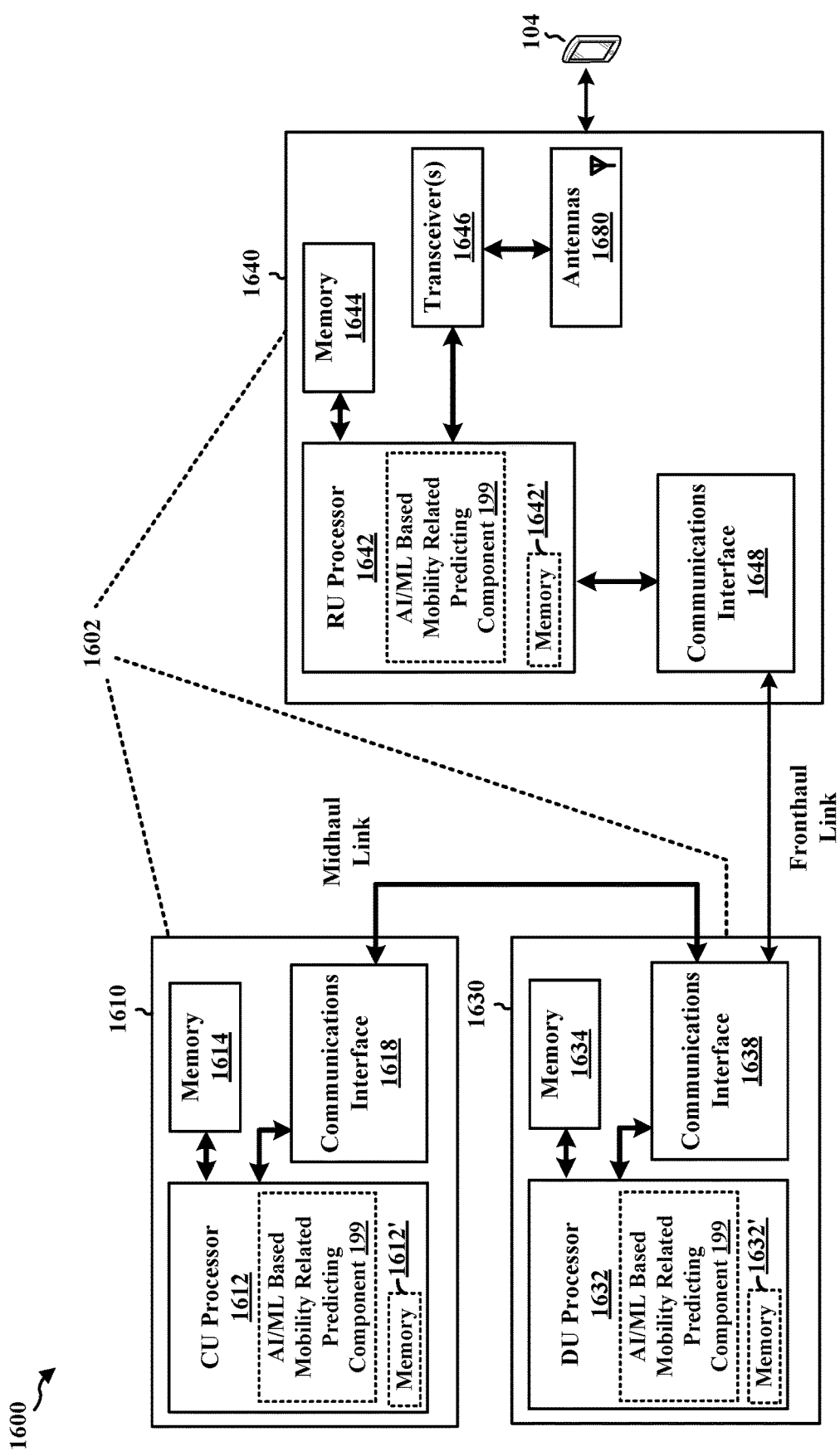
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the AI/ML based mobility predicting component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the AI/ML based mobility predicting component 199 of a source network node is configured to obtain at least one mobility related prediction associated with a UE or at least one target network node, the at least one mobility related prediction being derived by at least one neural network, and handover the UE from the source network node to the at least one target network node based on the at least one mobility related prediction. The AI/ML based mobility predicting component 199 of a target network node is configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction. The AI/ML based mobility predicting component 199 may be within one or more processors of one or more of the CU 1610, DU 1630, and the RU 1640. The AI/ML based mobility predicting component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may be a source network entity, and the network entity 1602 includes means for obtaining at least one mobility related prediction associated with a UE or at least one target network node, the at least one mobility related prediction being derived by at least one neural network, and means for handing over the UE from the source network node to the at least one target network node based on the at least one mobility related prediction. In one configuration, the at least one mobility related prediction is associated with the UE and includes at least one of a UE trajectory prediction, a UE traffic prediction, an RRM measurement prediction, or a UE location and mobility status, and the method further includes means for transmitting a handover message including the at least one mobility related prediction associated with the UE. In one configuration, the means for obtaining the at least one mobility related prediction may be configured to derive the at least one mobility related prediction associated with the UE using the at least one neural network of the source network node. In one configuration, the means for obtaining the at least one mobility related prediction may be configured to receive, from the UE, the at least one mobility related prediction associated with the UE, the at least one mobility related prediction associated with the UE being derived by the at least one neural network of the UE. In one configuration, the handover message is a handover request to the at least one target network node, and the network entity 1602 further includes means for receiving a handover request ACK from the at least one target network node. In one configuration, the handover message is a handover required message to a core network, and the at least one mobility related prediction associated with the UE is included in a container for the at least one target network node. In one configuration, the at least one mobility related prediction is associated with the at least one target network node and includes at least one of predictions of network resource capacity, including PRB/TNL, or an achievable QoS/QoE at the at least one target network node after the handover, where the means for obtaining the at least one mobility related prediction may be configured to receive, from the at least one target network node, the at least one mobility related prediction associated with the at least one target network node. In one configuration, the network entity 1602 further includes means for transmitting a handover request to the at least one target network node, where the at least one mobility related prediction associated with the at least one target network node is received in a handover request ACK from the at least one target network node. In one configuration, the network entity 1602 further includes means for transmitting a handover required message to a core network, and the at least one mobility related prediction associated with the at least one target network node is received in a handover command from the core network, the at least one mobility related prediction associated with the at least one target network node is included in a container from the at least one target network node. In one configuration, the network entity 1602 further includes means for transmitting a handover command for the UE, the handover command including the at least one mobility related prediction. In one configuration, the method further includes means for transmitting a handover command for the UE, the handover command including at least one parameter for a machine learning model for the UE to select a target resource configuration associated with a first target network node from the at least one target network node. In one configuration, the network entity 1602 further includes means for instructing the UE to relax at least one parameter of an RRM measurement for each of the at least one target network node at the UE. In one configuration, the network entity 1602 further includes means for transmitting at least one configuration for the UE to determine to relax at least one parameter of the RRM measurement for each of the at least one target network node at the UE. In one configuration, the at least one configuration is associated with at least one measurement object of the UE. In one configuration, the network entity 1602 further includes means for receiving an RRM measurement report including at least one flag indicating that the RRM measurement is based on the prediction of the mobility or a confidence level of the prediction. In one configuration, the network entity 1602 further includes means for transmitting at least one parameter for a machine learning model for the UE to decide RRM prediction and the at least one parameter of the RRM measurement. In another configuration, the network entity 1602 may be a target network entity, and the network entity 1602 includes means for receiving a handover request to handover a UE from a source network node, means for obtaining at least one mobility related prediction associated with the UE or the target network node, the at least one mobility related prediction being derived by at least one neural network, and means for transmitting a handover request ACK, the handover request ACK based at least in part on the at least one mobility related prediction. In one configuration, the at least one mobility related prediction is associated with the UE and includes at least one of a UE trajectory prediction, a UE traffic prediction, an RRM measurement prediction, or a UE location and mobility status, and the at least one mobility related prediction is extracted from the handover request. In one configuration, the handover request is received from the source network node. In one configuration, the handover request received from a core network, and the at least one mobility related prediction associated with the UE being included in a container from the source network node. In one configuration, the at least one mobility related prediction is associated with the target network node and includes at least one of predictions of network resource capacity, including PRB/TNL, or an achievable QoS/QoE at the at least one target network node after the handover, where the means for obtaining the at least one mobility related prediction is configured to derive the at least one mobility related prediction associated with the target network node using the at least one neural network of the target network node. In one configuration, the network entity 1602 further includes means for transmitting a handover request ACK to the at least one target network node. In one configuration, the network entity 1602 further includes means for transmitting a handover request ACK to a core network, the at least one mobility related prediction associated with the at least one target network node being included in a container to the source network node. In one configuration, the network entity 1602 further includes means for receiving an RRC reconfiguration from the UE to handover the UE from the source network node to the target network node. The means may be the AI/ML based mobility predicting component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

According to some aspects of the disclosure, a UE may be configured to obtain at least one mobility related prediction associated with the UE or at least one target network node, the at least one mobility related prediction being derived by at least one neural network, and switch from a source network node to a first target network node of the at least one target network node based on the at least one mobility related prediction. A source network node configured to obtain at least one mobility related prediction associated with a UE or at least one target network node, the at least one mobility related prediction being derived by at least one neural network, and handover the UE from the source network node to the at least one target network node based on the at least one mobility related prediction. A target network node configured to receive a handover request to handover a UE from a source network node, obtain at least one mobility related prediction associated with the UE or the target network node, the at least one mobility related prediction being derived by at least one neural network, and output for transmission a handover request ACK, the handover request ACK based at least in part on the at least one mobility related prediction.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a source network node, including obtaining at least one mobility related prediction associated with a UE or at least one target network node, the at least one mobility related prediction being derived by at least one neural network, and handing over the UE from the source network node to the at least one target network node based on the at least one mobility related prediction.

Aspect 2 is the method of aspect 1, where the at least one mobility related prediction is associated with the UE and includes at least one of a UE trajectory prediction, a UE traffic prediction, an RRM measurement prediction, or a UE location and mobility status, and the method further includes transmitting a handover message including the at least one mobility related prediction associated with the UE.

Aspect 3 is the method of aspect 2, where obtaining the at least one mobility related prediction further includes deriving the at least one mobility related prediction associated with the UE using the at least one neural network of the source network node.

Aspect 4 is the method of any of aspects 2 and 3, where obtaining the at least one mobility related prediction further includes receiving, from the UE, the at least one mobility related prediction associated with the UE, the at least one mobility related prediction associated with the UE being derived by the at least one neural network of the UE.

Aspect 5 is the method of any of aspects 2 to 4, where the handover message is a handover request to the at least one target network node, and the method further includes receiving a handover request ACK from the at least one target network node.

Aspect 6 is the method of any of aspects 2 to 5, where the handover message is a handover required message to a core network, and the at least one mobility related prediction associated with the UE is included in a container for the at least one target network node.

Aspect 7 is the method of any of aspects 1 to 6, where the at least one mobility related prediction is associated with the at least one target network node and includes at least one of predictions of network resource capacity, including PRB/TNL, or an achievable QoS/QoE at the at least one target network node after the handover, where obtaining the at least one mobility related prediction further includes receiving, from the at least one target network node, the at least one mobility related prediction associated with the at least one target network node.

Aspect 8 is the method of aspect 7, where the method further includes transmitting a handover request to the at least one target network node, where the at least one mobility related prediction associated with the at least one target network node is received in a handover request ACK from the at least one target network node.

Aspect 9 is the method of any of aspects 7 and 8, where the method further includes transmitting a handover required message to a core network, and the at least one mobility related prediction associated with the at least one target network node is received in a handover command from the core network, the at least one mobility related prediction associated with the at least one target network node is included in a container from the at least one target network node.

Aspect 10 is the method of any of aspects 1 to 9, where the method further includes transmitting a handover command for the UE, the handover command including the at least one mobility related prediction.

Aspect 11 is the method of any of aspects 1 to 3, where the method further includes transmitting a handover command for the UE, the handover command including at least one parameter for a machine learning model for the UE to select a target resource configuration associated with a first target network node from the at least one target network node.

Aspect 12 is the method of any of aspects 1 to 3, where the method further includes instructing the UE to relax at least one parameter of an RRM measurement for each of the at least one target network node at the UE.

Aspect 13 is the method of aspect 12, where the method further includes transmitting at least one configuration for the UE to determine to relax at least one parameter of the RRM measurement for each of the at least one target network node at the UE.

Aspect 14 is the method of aspect 13, where the at least one configuration is associated with at least one measurement object of the UE.

Aspect 15 is the method of any of aspects 13 and 14, where the method further includes receiving an RRM measurement report including at least one flag indicating that the RRM measurement is based on the prediction of the mobility or a confidence level of the prediction.

Aspect 16 is the method of any of aspects 12 to 15, where the method further includes transmitting at least one parameter for a machine learning model for the UE to decide RRM prediction and the at least one parameter of the RRM measurement.

Aspect 17 is an apparatus for wireless communication including at least one processor coupled to a memory and configured to implement any of aspects 1 to 16, further including a transceiver coupled to the at least one processor.

Aspect 18 is an apparatus for wireless communication including means for implementing any of aspects 1 to 16.

Aspect 19 is a non-transitory computer-readable medium storing computer executable code, where the code when executed by a processor causes the processor to implement any of aspects 1 to 16.

Aspect 20 is a method of wireless communication at a target network node, including receiving a handover request to handover a UE from a source network node, obtaining at least one mobility related prediction associated with the UE or the target network node, the at least one mobility related prediction being derived by at least one neural network, and transmitting a handover request ACK, the handover request ACK based at least in part on the at least one mobility related prediction.

Aspect 21 is the method of aspect 20, where the at least one mobility related prediction is associated with the UE and includes at least one of a UE trajectory prediction, a UE traffic prediction, an RRM measurement prediction, or a UE location and mobility status, and the at least one mobility related prediction is extracted from the handover request.

Aspect 22 is the method of aspect 21, where the handover request is received from the source network node.

Aspect 23 is the method of any of aspects 21 and 22, where the handover request received from a core network, and the at least one mobility related prediction associated with the UE being included in a container from the source network node.

Aspect 24 is the method of any of aspects 20 to 23, where the at least one mobility related prediction is associated with the target network node and includes at least one of predictions of network resource capacity, including PRB/TNL, or an achievable QoS/QoE at the at least one target network node after the handover, and obtaining the at least one mobility related prediction further includes deriving the at least one mobility related prediction associated with the target network node using the at least one neural network of the target network node.

Aspect 25 is the method of aspect 24, where the method further includes transmitting a handover request ACK to the at least one target network node.

Aspect 26 is the method of any of aspects 24 and 25, where the method further includes transmitting a handover request ACK to a core network, the at least one mobility related prediction associated with the at least one target network node being included in a container to the source network node.

Aspect 27 is the method of any of aspects 20 to 26, where the method further includes receiving an RRC reconfiguration from the UE to handover the UE from the source network node to the target network node.

Aspect 28 is an apparatus for wireless communication including at least one processor coupled to a memory and configured to implement any of aspects 20 to 27, further including a transceiver coupled to the at least one processor.

Aspect 29 is an apparatus for wireless communication including means for implementing any of aspects 20 to 27.

Aspect 30 is a non-transitory computer-readable medium storing computer executable code, where the code when executed by a processor causes the processor to implement any of aspects 20 to 27.

Aspect 31 is a method of wireless communication at a UE, including obtaining at least one mobility related prediction associated with the UE or at least one target network node, the at least one mobility related prediction being derived by at least one neural network, and switching from a source network node to a first target network node of the at least one target network node, the first target network node associated with a target resource configuration selected based on the at least one mobility related prediction.

Aspect 32 is the method of aspect 31, where the at least one mobility related prediction is associated with the UE and includes at least one of a UE trajectory prediction, a UE traffic prediction, an RRM measurement prediction, or a UE location and mobility status, and obtaining the at least one mobility related prediction further includes deriving the at least one mobility related prediction associated with the UE using the at least one neural network of the UE.

Aspect 33 is the method of any of aspects 31 and 32, where the method further includes transmitting the at least one mobility related prediction to the source network node.

Aspect 34 is the method of any of aspects 31 to 33, where the at least one mobility related prediction is associated with the at least one target network node and includes at least one of predictions of network resource capacity, including PRB/TNL, or an achievable QoS/QoE at the at least one target network node after a handover of the UE from the source network node to the target network node, and obtaining the at least one mobility related prediction further includes receiving, from the source network node, the at least one mobility related prediction associated with the at least one target network node.

Aspect 35 is the method of any of aspects 31 to 34, where the method further includes receiving a handover command from the source network node, the handover command including the at least one mobility related prediction.

Aspect 36 is the method of aspect 35, where the method further includes selecting to switch to the first target network node from the at least one target network node based on the at least one mobility related prediction.

Aspect 37 is the method of any of aspects 31 to 36, where the method further includes receiving a handover command for the UE, the handover command including at least one parameter for a machine learning model of the UE to select a first target network node from the at least one target network node, and selecting the target resource configuration associated with the first target network node from the at least one target network node based on the machine learning model, where an input of the machine learning model includes at least one of radio measurements, assistance information from the source network node, location/motion sensor measurements of the UE, and an output of the machine learning model includes at least one of a target cell to trigger the handover, a target cell to execute the handover, or target cells to measure.

Aspect 38 is the method of any of aspects 31 to 37, where the method further includes transmitting an RRC message to the target network node indicating the get resource configuration associated with the first target network node.

Aspect 39 is the method of any of aspects 31 to 38, where the method further includes receiving an instruction to relax at least one parameter of an RRM measurement for each of the at least one target network node at the UE.

Aspect 40 is the method of aspect 39, where the method further includes receiving at least one configuration from the source network node to determine to relax at least one parameter of the RRM measurement for each of the at least one target network node at the UE.

Aspect 41 is the method of aspect 40, where the at least one configuration is associated with at least one measurement object of the UE.

Aspect 42 is the method of any of aspects 31 to 33, where the method further includes transmitting an RRM measurement report including at least one flag indicating that the RRM measurement is based on the prediction of the mobility or a confidence level of the prediction.

Aspect 43 is the method of any of aspects 39 to 42, where the method further includes receiving at least one parameter for a machine learning model for the UE to decide RRM prediction and the at least one parameter of the RRM measurement.

Aspect 44 is an apparatus for wireless communication including at least one processor coupled to a memory and configured to implement any of aspects 31 to 43, further including a transceiver coupled to the at least one processor.

Aspect 45 is an apparatus for wireless communication including means for implementing any of aspects 31 to 43.

Aspect 46 is a non-transitory computer-readable medium storing computer executable code, where the code when executed by a processor causes the processor to implement any of aspects 31 to 43.

What is claimed is:

1. An apparatus for wireless communication at a source network node, comprising:
memory; and
at least one processor coupled to the memory and, based at least in part on information stored in the memory, the at least one processor is configured to:
receive at least one mobility related prediction associated with at least one target network node, the at least one mobility related prediction being derived by at least one neural network; and
handover a user equipment (UE) from the source network node to the at least one target network node based on the at least one mobility related prediction received from the at least one target network node.

2. The apparatus of claim 1, wherein the at least one processor is further configured to obtain, prior to the handover, one or more mobility related predictions associated with the UE, wherein the handover is further based on the one or more mobility related predictions associated with the UE, wherein the one or more mobility related predictions includes at least one of:
a UE trajectory prediction,
a UE traffic prediction,
a radio resource management (RRM) measurement prediction, or
a UE location and mobility status,
wherein the at least one processor is further configured to:
transmit a handover message including the at least one mobility related prediction associated with the UE.

3. The apparatus of claim 2, wherein the at least one processor is further configured to:
derive the one or more mobility related predictions associated with the UE using the at least one neural network of the source network node.

4. The apparatus of claim 2, wherein the at least one processor is further configured to:
receive, from the UE, the one or more mobility related predictions associated with the UE, the one or more mobility related predictions associated with the UE being derived by the at least one neural network of the UE.

5. The apparatus of claim 2, wherein the handover message is a handover request to the at least one target network node,
wherein the at least one processor is further configured to receive a handover request acknowledgement (ACK) from the at least one target network node.

6. The apparatus of claim 2, wherein the handover message is a handover required message to a core network, and the one or more mobility related predictions associated with the UE is included in a container for the at least one target network node.

7. The apparatus of claim 1, wherein the at least one mobility related prediction is associated with the at least one target network node and includes at least one of:
predictions of network resource capacity, including physical resource block (PRB) or transport network layer (TNL), or
an achievable quality of service (QOS) or quality of experience (QoE) (QOS/QoE) at the at least one target network node after the handover,
wherein, to obtain the at least one mobility related prediction, the at least one processor is further configured to receive, from the at least one target network node, the at least one mobility related prediction associated with the at least one target network node.

8. The apparatus of claim 7, wherein the at least one processor is further configured to transmit a handover request to the at least one target network node, wherein the at least one mobility related prediction associated with the at least one target network node is received in a handover request acknowledgement (ACK) from the at least one target network node.

9. The apparatus of claim 7, wherein the at least one processor is further configured to transmit a handover required message to a core network,
wherein the at least one mobility related prediction associated with the at least one target network node is received in a handover command from the core network, the at least one mobility related prediction associated with the at least one target network node is included in a container from the at least one target network node.

10. The apparatus of claim 2, wherein the at least one processor is further configured to transmit a handover command for the UE, the handover command including the at least one mobility related prediction or the one or more mobility related predictions associated with the UE.

11. The apparatus of claim 1, wherein the at least one processor is further configured to:
transmit a handover command for the UE, the handover command including at least one parameter for a machine learning model for the UE to select a target resource configuration associated with a first target network node from the at least one target network node.

12. The apparatus of claim 1, wherein the at least one processor is further configured to instruct the UE to relax at least one parameter of a radio resource management (RRM) measurement for each of the at least one target network node at the UE.

13. The apparatus of claim 12, wherein the at least one processor is further configured to transmit at least one configuration for the UE to determine to relax the at least one parameter of the RRM measurement for each of the at least one target network node at the UE.

14. The apparatus of claim 13, wherein the at least one configuration is associated with at least one measurement object of the UE.

15. The apparatus of claim 13, wherein the at least one processor is further configured to receive an RRM measurement report including at least one flag indicating that the RRM measurement is based on the prediction of the mobility or a confidence level of the prediction.

16. The apparatus of claim 12, wherein the at least one processor is further configured to transmit at least one parameter for a machine learning model for the UE to decide RRM prediction and the at least one parameter of the RRM measurement.

17. An apparatus for wireless communication at a target network node, comprising:
memory; and
at least one processor coupled to the memory and, based at least in part on information stored in the memory, the at least one processor is configured to:
receive a handover request to handover a user equipment (UE) from a source network node;
derive at least one mobility related prediction associated with the target network node, the at least one mobility related prediction being derived by at least one neural network of the target network node; and
transmit a handover request acknowledgement (ACK), the handover request ACK indicating the at least one mobility related prediction associated with the target network node.

18. The apparatus of claim 17, wherein the at least one mobility related prediction associated with the target network node includes at least one of:
predictions of network resource capacity, including physical resource block (PRB) or transport network layer (TNL), or
an achievable quality of service (QOS) or quality of experience (QoE) (QOS/QoE) at the target network node after the handover.

19. The apparatus of claim 18, wherein the handover request ACK is to the at least one target network node.

20. The apparatus of claim 18, wherein the handover request ACK is to a core network, wherein the at least one mobility related prediction associated with the at least one target network node is included in a container to the source network node.

21. An apparatus for wireless communication at a user equipment (UE), comprising:
memory; and
at least one processor coupled to the memory and, based at least in part on information stored in the memory, the at least one processor is configured to:
receive at least one mobility related prediction associated with or at least one target network node, the at least one mobility related prediction being derived by at least one neural network; and
switch from a source network node to a first target network node of the at least one target network node, the first target network node associated with a target resource configuration based on the at least one mobility related prediction associated with the at least one target network node.

22. The apparatus of claim 21, wherein the at least one mobility related prediction associated with the at least one target network node includes at least one of:
predictions of network resource capacity, including physical resource block (PRB) or transport network layer (TNL), or
an achievable quality of service (QOS) or quality of experience (QoE) (QOS/QoE) at the at least one target network node after a handover of the UE from the source network node to a respective target network node,
wherein, to receive the at least one mobility related prediction, the at least one processor is further configured to receive, from the source network node, the at least one mobility related prediction associated with the at least one target network node.

23. The apparatus of claim 21, wherein the at least one processor is further configured to receive a handover command from the source network node, the handover command including the at least one mobility related prediction.

24. The apparatus of claim 23, wherein the at least one processor is further configured to select to switch to the first target network node from the at least one target network node based on the at least one mobility related prediction.

25. The apparatus of claim 21, wherein the at least one processor is further configured to:
receive a handover command for the UE, the handover command including at least one parameter for a machine learning model of the UE to select a target network node from the at least one target network node; and
select the target resource configuration associated with the first target network node from the at least one target network node based on the machine learning model, wherein an input to the machine learning model includes at least one of radio measurements, assistance information from the source network node, location/motion sensor measurements of the UE, and an output from the machine learning model includes at least one of a target cell to trigger or execute the handover or target cells to measure.

26. The apparatus of claim 21, wherein, to switch from the source network node to the first target network node, the at least one processor is further configured to:
transmit a radio resource control (RRC) message to the first target network node indicating the target resource configuration associated with the first target network node.

27. The apparatus of claim 21, wherein the at least one processor is further configured to receive an instruction to relax at least one parameter of a radio resource management (RRM) measurement for each of the at least one target network node at the UE.

28. The apparatus of claim 27, wherein the at least one processor is further configured to receive at least one configuration from the source network node to determine to relax the at least one parameter of the RRM measurement for each of the at least one target network node at the UE.

29. The apparatus of claim 27, wherein the at least one processor is further configured to receive at least one parameter for a machine learning model for the UE to decide RRM prediction and the at least one parameter of the RRM measurement.

30. A method of at a source network node, comprising:
receiving at least one mobility related prediction associated with at least one target network node, the at least one mobility related prediction being derived by at least one neural network; and
handing over a user equipment (UE) from the source network node to the at least one target network node based on the at least one mobility related prediction received from the at least one target network node.

* * * * *